US008408582B2

(12) United States Patent
Lunt et al.

(10) Patent No.: US 8,408,582 B2
(45) Date of Patent: Apr. 2, 2013

(54) INFLATABLE AIRBAG ASSEMBLIES WITH HEAT SHIELDS

(75) Inventors: Larry F. Lunt, Brigham City, UT (US); Louis A. Mueller, Roy, UT (US); Mark I. Enders, Pleasant View, UT (US); Mark S. Hatfield, Providence, UT (US)

(73) Assignee: Autoliv ASP, Inc., Ogden, UT (US)

( * ) Notice: Subject to any disclaimer, the term of this patent is extended or adjusted under 35 U.S.C. 154(b) by 127 days.

(21) Appl. No.: 12/821,899

(22) Filed: Jun. 23, 2010

(65) Prior Publication Data
US 2011/0316263 A1    Dec. 29, 2011

(51) Int. Cl.
*B60R 21/217* (2011.01)
*B60R 21/26* (2011.01)
(52) U.S. Cl. ...................... 280/728.2; 280/742
(58) Field of Classification Search ............... 280/728.2, 280/742
See application file for complete search history.

(56) References Cited

U.S. PATENT DOCUMENTS

| 4,153,273 | A | * | 5/1979 | Risko ............................ 280/740 |
| 4,944,527 | A | | 7/1990 | Bishop et al. |
| 5,284,358 | A | * | 2/1994 | Rhein ......................... 280/728.2 |
| 5,340,147 | A | * | 8/1994 | Fontecchio et al. ........ 280/728.2 |
| 5,560,645 | A | | 10/1996 | Lewis et al. |
| 5,918,898 | A | * | 7/1999 | Wallner et al. ............. 280/728.2 |
| 6,186,542 | B1 | | 2/2001 | Enders et al. |
| 6,270,113 | B1 | | 8/2001 | Wipasuramonton et al. |
| 6,543,803 | B1 | * | 4/2003 | Harada et al. ............... 280/730.2 |
| 6,802,526 | B2 | * | 10/2004 | Dumbrique et al. ....... 280/728.2 |
| 7,364,194 | B2 | * | 4/2008 | Mabuchi et al. ............... 280/741 |
| 7,370,884 | B2 | | 5/2008 | Clark et al. |
| 7,604,250 | B2 | * | 10/2009 | Hotta et al. ................. 280/728.2 |
| 7,669,886 | B2 | * | 3/2010 | Astrom .......................... 280/729 |
| 7,798,517 | B2 | * | 9/2010 | Ishida ......................... 280/728.2 |
| 7,819,420 | B2 | * | 10/2010 | Adachi et al. .............. 280/730.1 |
| 7,862,078 | B2 | * | 1/2011 | Yokota ........................ 280/730.2 |
| 7,926,838 | B2 | * | 4/2011 | Honda et al. .................. 280/729 |
| 8,113,537 | B2 | * | 2/2012 | Fechner et al. ............. 280/728.2 |
| 2002/0130493 | A1 | | 9/2002 | Ford et al. |
| 2003/0025312 | A1 | | 2/2003 | Amamori |
| 2005/0082801 | A1 | * | 4/2005 | Koh ............................... 280/732 |
| 2005/0116446 | A1 | * | 6/2005 | Mabuchi et al. ........... 280/728.2 |
| 2005/0121884 | A1 | * | 6/2005 | Ogata et al. ................. 280/728.2 |
| 2005/0140123 | A1 | * | 6/2005 | Hotta et al. ................. 280/730.1 |
| 2006/0108777 | A1 | * | 5/2006 | Mabuchi et al. ........... 280/730.2 |
| 2006/0249932 | A1 | | 11/2006 | Marriott |
| 2006/0279073 | A1 | * | 12/2006 | Hotta et al. ................. 280/730.1 |
| 2007/0096439 | A1 | * | 5/2007 | Kashiwagi ................. 280/728.2 |
| 2008/0088118 | A1 | * | 4/2008 | Wipasuramonton et al. ............................. 280/728.2 |
| 2008/0252048 | A1 | * | 10/2008 | Kashiwagi ................. 280/728.2 |
| 2008/0290637 | A1 | | 11/2008 | Mueller et al. |
| 2010/0109365 | A1 | * | 5/2010 | Shibata et al. ............. 296/37.12 |
| 2011/0148077 | A1 | * | 6/2011 | Enders ........................ 280/728.2 |

OTHER PUBLICATIONS

Notification of Transmittal of the International Search Report and the Written Opinion of the International Searching Authority issued Sep. 15, 2011 in International Application No. PCT/US2011/037692.

* cited by examiner

*Primary Examiner* — Paul N Dickson
*Assistant Examiner* — Barry Gooden, Jr.
(74) *Attorney, Agent, or Firm* — Stoel Rives LLP

(57) ABSTRACT

Heat shields are used to shield an airbag from hot gasses issuing from an inflator. The heat shields can be a piece of thin metal that is coupled to the airbag cushion or the inflator. The heat shield can be held in place by being attached or coupled to the airbag and/or the inflator.

30 Claims, 24 Drawing Sheets

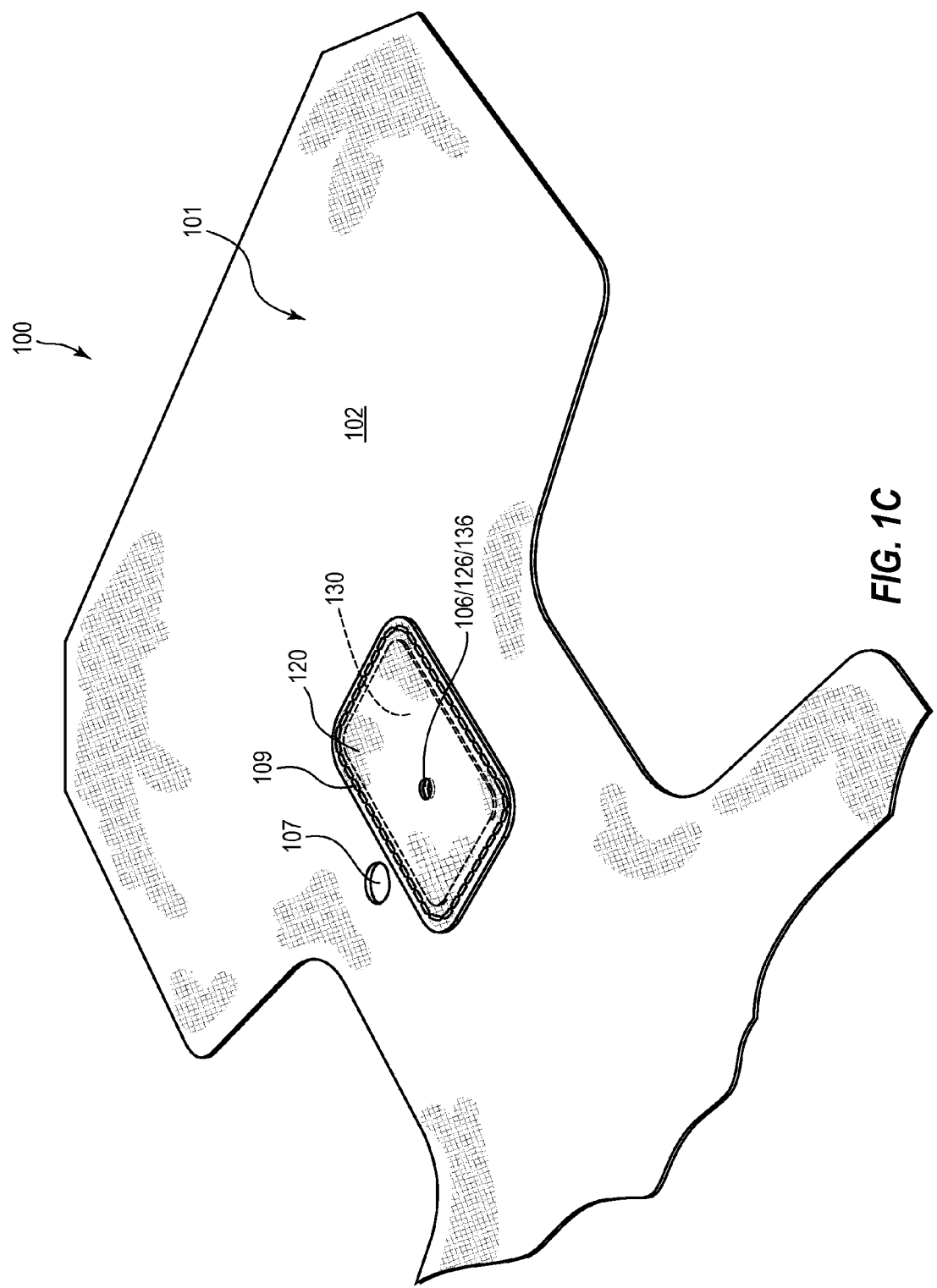

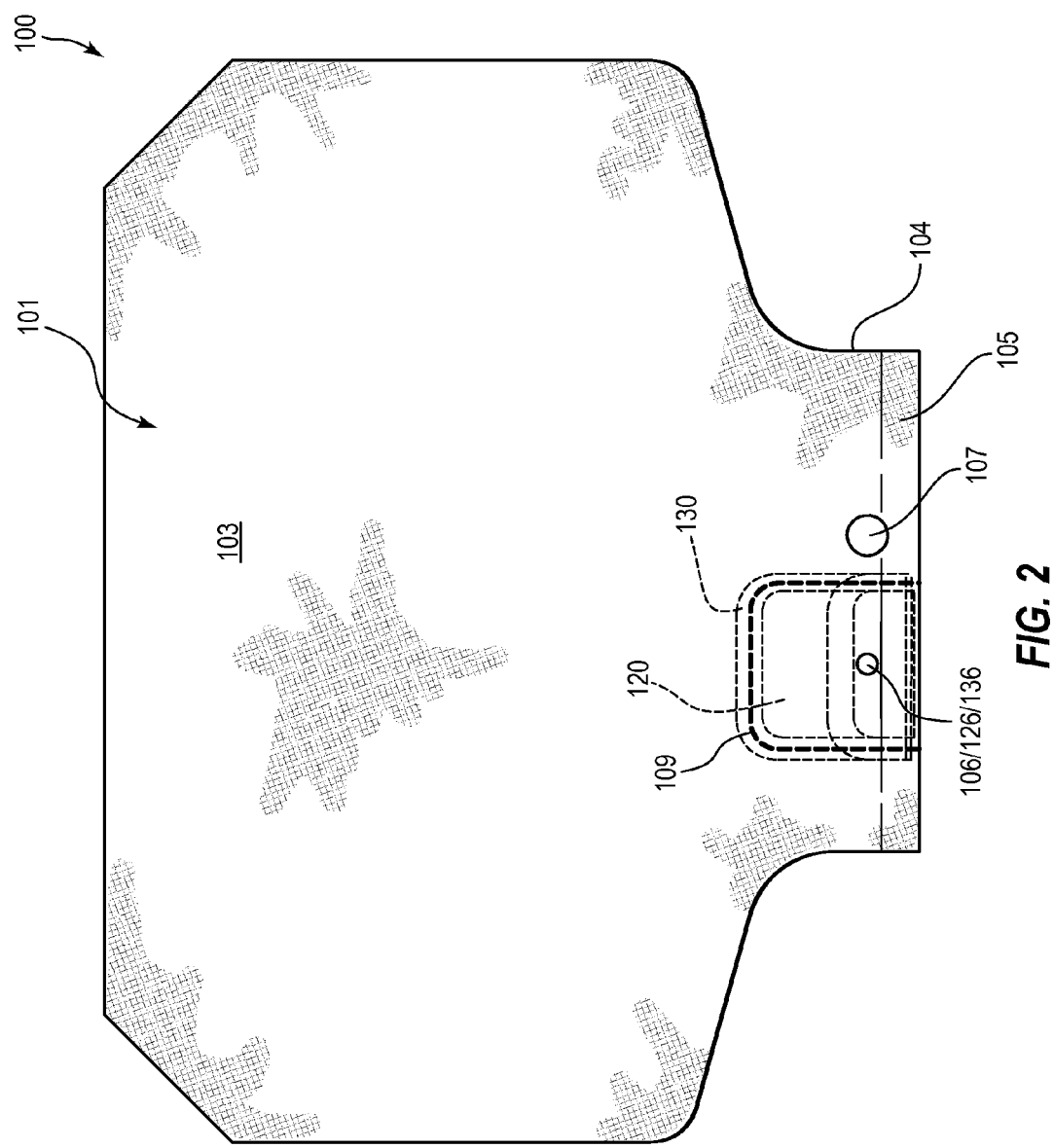

INFLATABLE AIRBAG ASSEMBLIES WITH HEAT SHIELDS

TECHNICAL FIELD

The present disclosure relates generally to the field of automotive protective systems. More specifically, the present disclosure relates to inflatable airbag cushion assemblies having heat shields.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

FIG. 1C is a top perspective view of the portion of the assembly of FIG. 1B after the portions of the assembly have been coupled together.

FIG. 2 is a top elevation view of the portion of the airbag assembly of FIG. 1C.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, side airbag, knee airbag, or any other airbag type.

During installation, the airbags are rolled, folded, or both, and are retained in the packaged configuration behind a cover. During a collision event, vehicle sensors trigger the activation of an inflator, which rapidly fills the airbag with inflation gas. Thus the airbag rapidly changes confirmations from the packaged configuration to an expanded configuration.

Figure 1A:
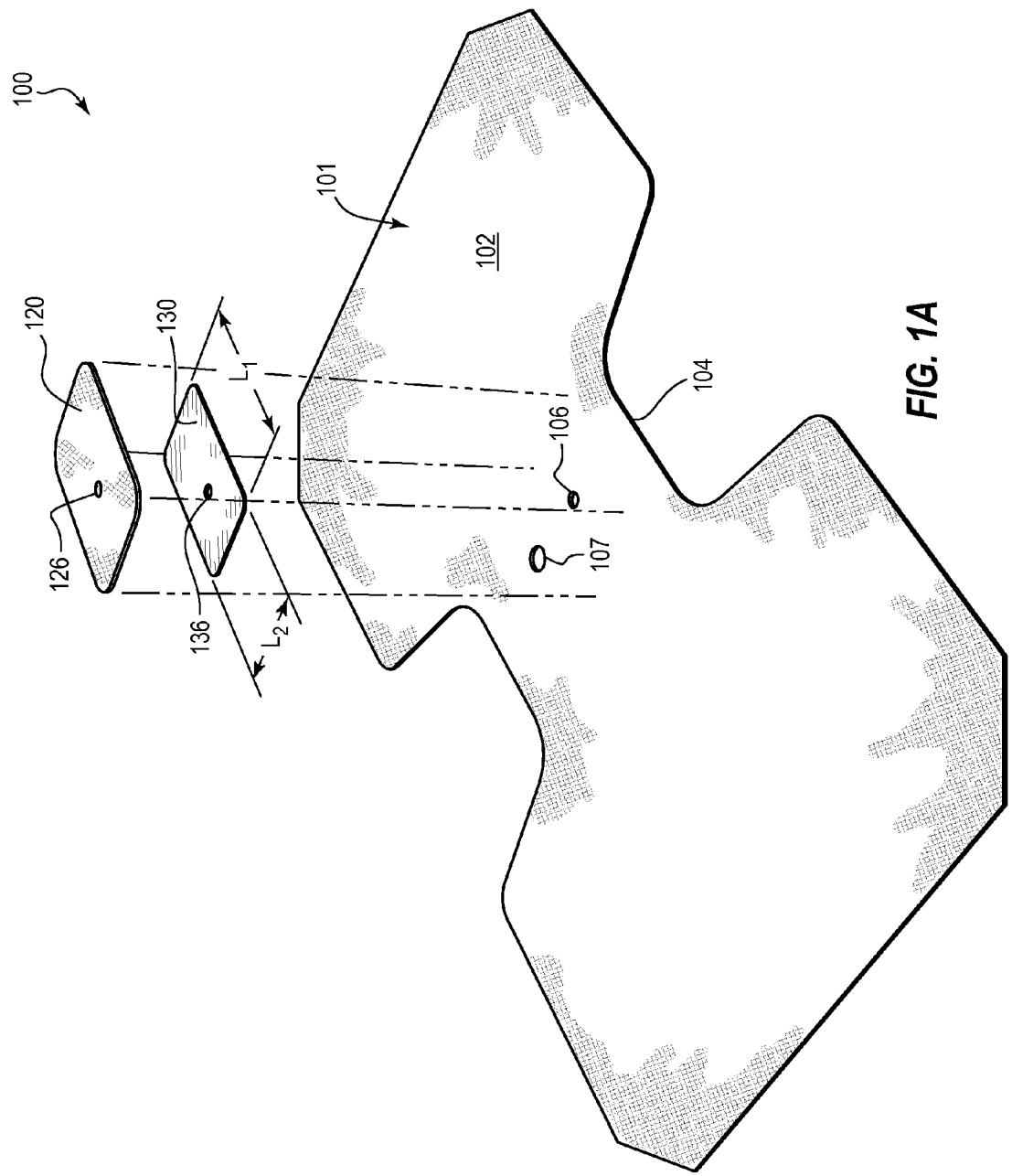
FIG. 1A is a top exploded perspective view of a portion of an airbag assembly.
Figure 1B:
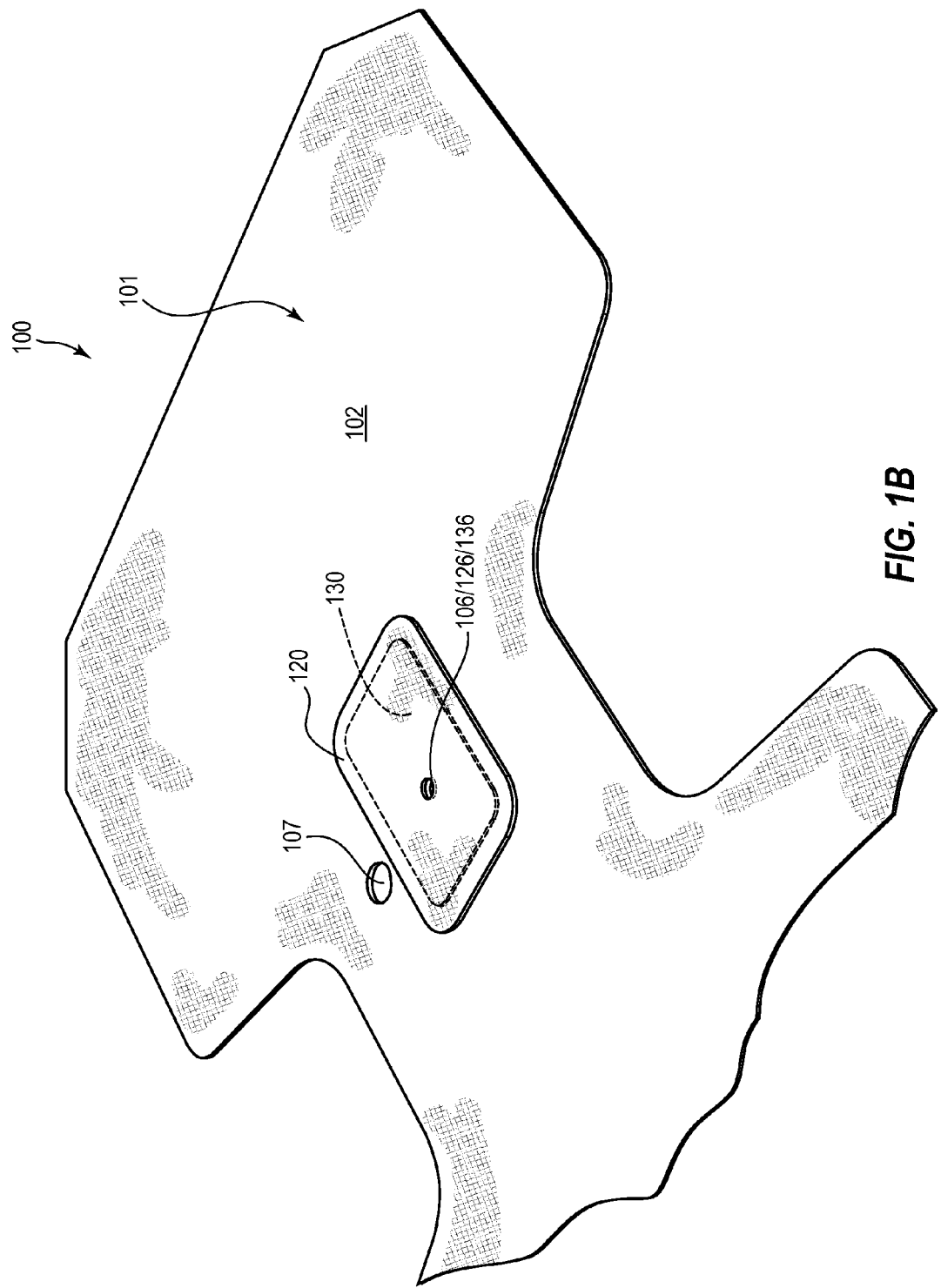
FIG. 1B is a top perspective view of the portion of the assembly of FIG. 1A after portions of the assembly have been placed in position.

FIGS. 1A-1C are top perspective views of a portion of an airbag assembly 100. Depicted in the figures is an inside face 102 of a panel of material 101, from which a portion of an airbag cushion may be formed. Panel 101 comprises a sheet of fabric that may comprise a woven nylon material, or any other material that is well known in the art. Panel 101 comprises a rectangular shape that is defined by a perimeter and a middle portion 104. Panel 101 may be said to have an "I" or "H" shape. The length and/or width of panel 101 may be varied according to different embodiments. An inflator insert aperture 107 and an inflator stem aperture 106 may be formed in panel 101. A heat shield 120 and a heat shield cover 130 may each have an aperture 126 and 136 for receiving a mounting stem of an inflator.

FIG. 1B depicts the portion of airbag assembly 100 of FIG. 1A after heat shield 130 and cover 120 have been laid on inside face 102 of panel 101 such that the heat shield is sandwiched between the cover and the inside face of the panel of material. The cover and heat shield are placed such that inflator mounting stem apertures 106, 126 and 136 are aligned and do not block inflator insert aperture 107.

FIG. 1C depicts the portion of airbag assembly 100 of FIG. 1B after cover 120 has been coupled to inside face 102 of panel of material 101 via stitching 109. In the depicted embodiment, stitching 109 does not protrude through heat shield 130; however, in another embodiment, the stitching may protrude through the heat shield and the cover. The cover and heat shield are placed such that inflator mounting stem apertures 106, 126 and 136 are aligned and do not block inflator insert aperture 107.

Cover 120 may comprise a piece of material, which in some embodiments may comprise the same type of material as the material from which the airbag is formed. Heat shield 130 may comprise a piece of a heat resistant material, such as metal. In one embodiment, the heat shield comprises stainless steel, such as AISI stainless steel types 300, 400, 500, or 600 series. In one embodiment, the heat shield comprises AISI type 301 stainless steel. In another embodiment, the heat shield comprises carbon steel, such as AISI types 1008 to 1045 carbon steel. Heat shield 130 may comprise rectangular piece with a first length $L_1$ between about 40 mm and about 60 mm and a second length $L_2$ between about 90 mm and about 110 mm. Heat shield 130 may comprise a thickness between about 0.25 inches and about 0.001 inches.

One skilled in the art will recognize that a variety of types and configurations of covers and heat shields can be employed without departing from the spirit of the present disclosure. For example, in some embodiments, the heat shield may comprise more than one aperture, or alternatively, no apertures at all. Further, the heat shield may comprise any suitable size or shape. Also, the head shield may comprise any suitable material in addition to, or instead of, steel. For example, the heat shield may comprise any suitable metal. One skilled in the art will also recognize that a variety of types and configurations of heat shield covers can be employed without departing from the spirit of the present disclosure. For example, the cover may comprise any suitable size, shape, or material.

FIG. 2 is a perspective view of the portion of airbag assembly 100 depicted in FIG. 1C, after panel of material 101 has been folded at a middle portion 104, such that the panel of material forms two opposing panels. Cover 120 and heat shield 130 are coupled to the inside face of panel 101 via stitching 109. An outside face 103 of panel 101 is located on an opposite side of panel 101, compared to the inside face. Fold 105 may be formed at middle portion 104. Inflator stem apertures 106, 126, and 136 as well as inflator insert aperture 107 may be formed or aligned at middle portion 104.

Heat shields described herein may comprise an unshaped configuration or a shaped configuration. In the unshaped configuration, the heat shield may comprise a planar shape, such as depicted in FIGS. 1C, 10, 11B, 12A, and 15A. In the shaped configuration, the heat shield may comprise a non-planar shape, such as depicted in FIGS. 3, 7, 8, 12B, 14, and 15B. In the shaped configuration, the heat shield may be said to comprise a "U" shape and/or a "C" shape. Further, the heat shield in the shaped configuration may comprise an asymmetric shape, such as an asymmetric "U" or "C" shape. The termini of a "U" shape are substantially parallel, whereas the termini of a "C" shape are not. A magnitude of force required to manipulate the heat shields described herein from the unshaped to the shaped configuration is human-scale. Human-scale magnitudes of force are those that can be generated by a human without powered-machine or powered-tool assistance. However, during assembly, a worker may place the heat shield within a clamp or guide.

Figure 3:
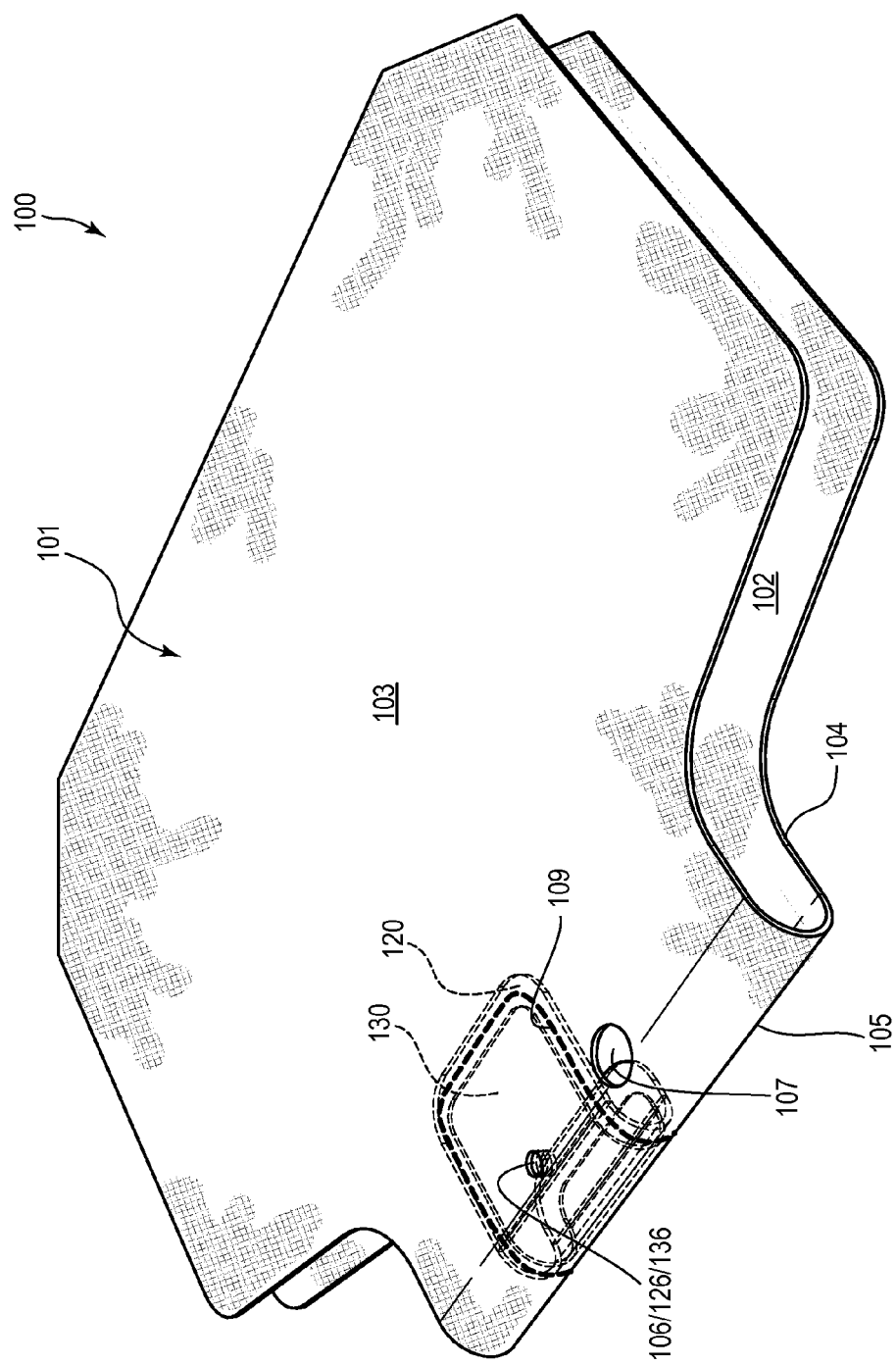
FIG. 3 is a perspective view of the portion of the assembly of FIG. 1A after a panel of material has been folded.
Figure 4:
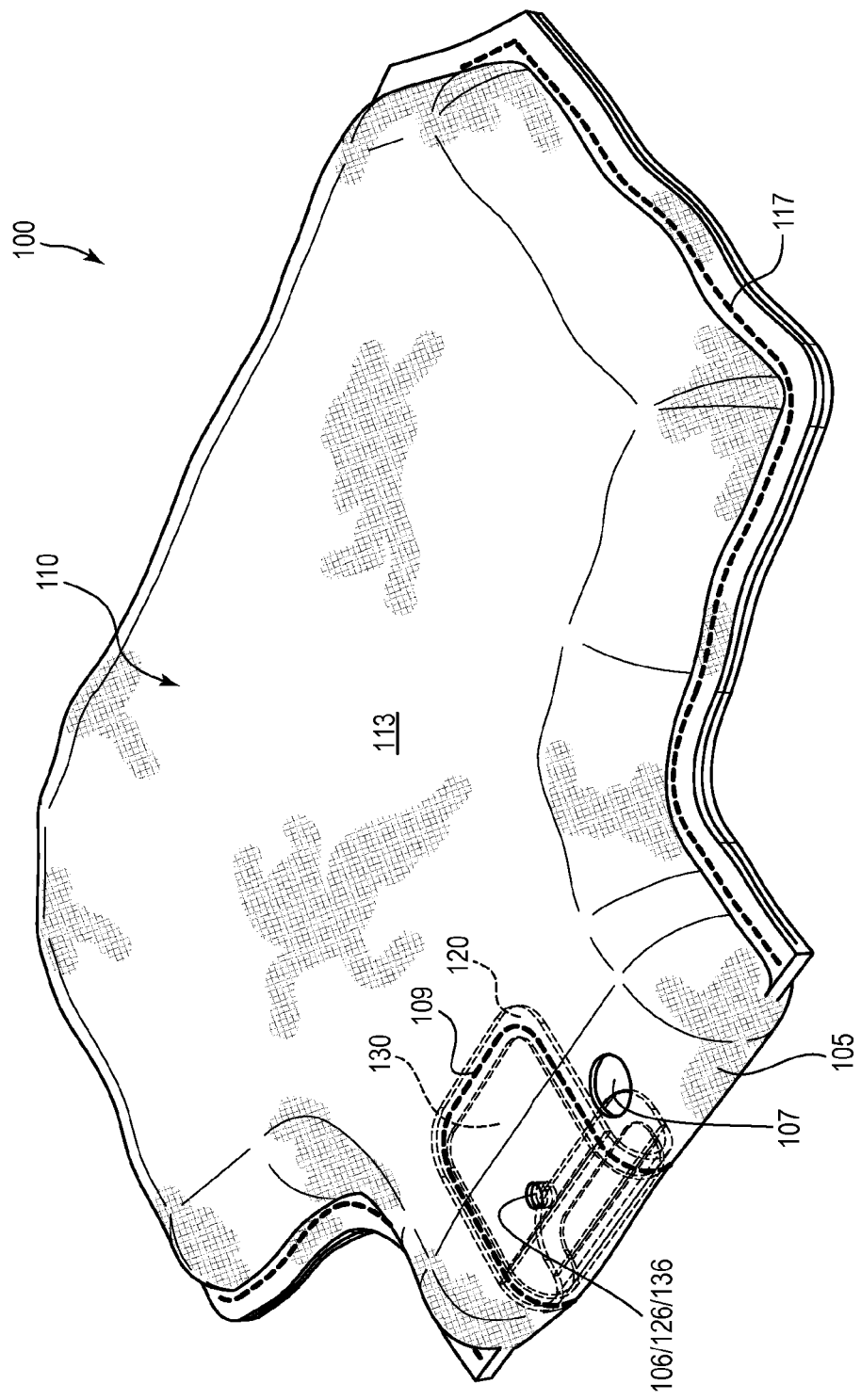
FIG. 4 is a perspective view of the portion of the assembly of FIG. 3 after the panel of material has been sewn to itself to form an inflatable airbag cushion.

FIGS. 3-4 are perspective views of the portion of airbag assembly 100 depicted in FIG. 2, after panel of material 101 has been folded at a middle portion 104, such that the panel of material forms two opposing panels. FIG. 4 depicts panel 101 after the opposing panels have been coupled together along their perimeters to form a perimeter seam 117, which in the depicted embodiment, comprises stitching. Cover 120 and heat shield 130 are coupled to inside face 102 of panel 101 via stitching 109. An outside face 103 of panel 101 is located on an opposite side of panel 101, compared to inside face 102. After being sewn, airbag 110 comprises a car-forward face 113 and a car-rearward face (not depicted). Fold 105 may be formed at middle portion 104. Inflator stem apertures 106, 126, and 136 as well as inflator insert aperture 107 may be formed or aligned at middle portion 104.

Figure 5:
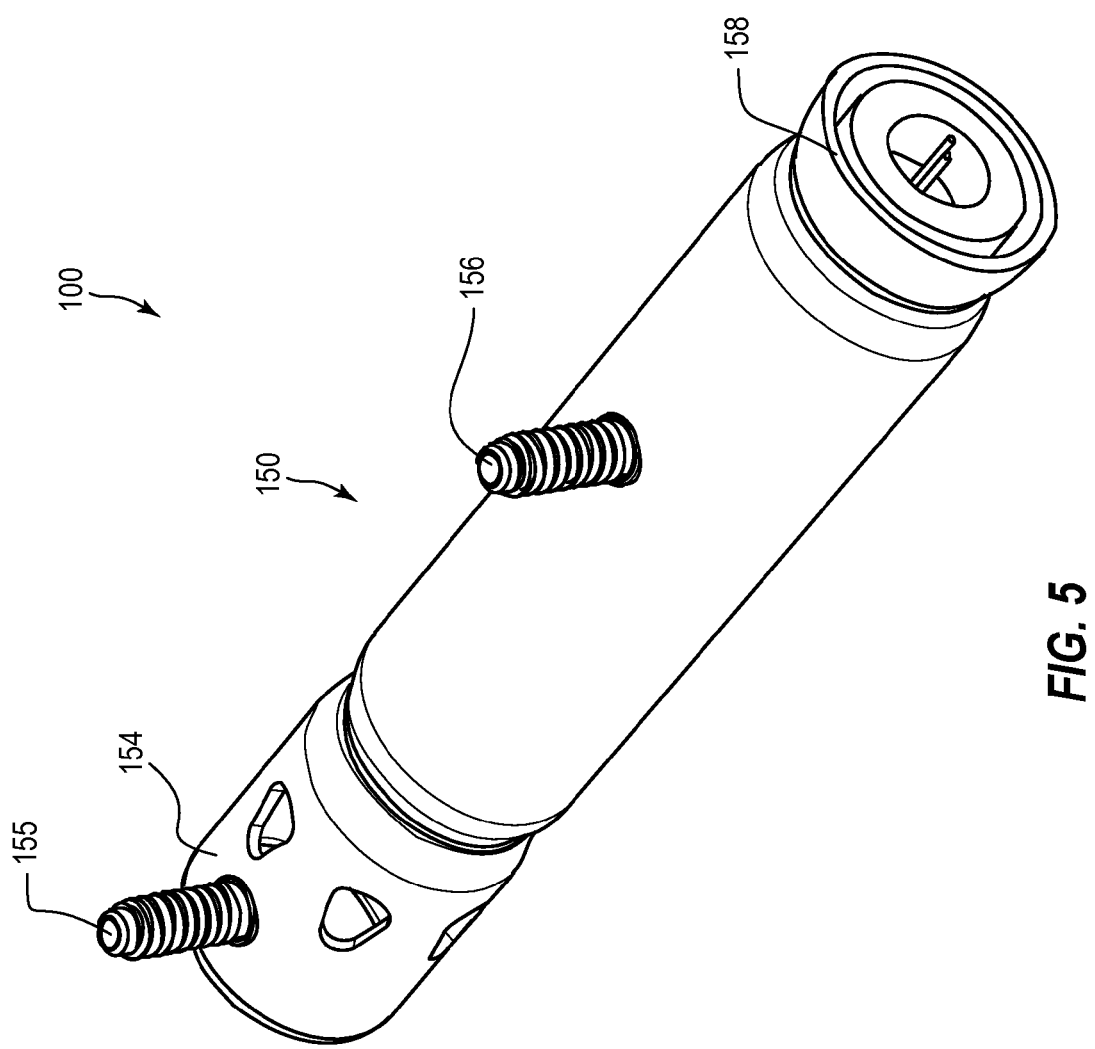
FIG. 5 is a perspective view of an inflator, which may be a component of the airbag assembly of FIG. 1A.

FIG. 5 is a perspective view of a portion of airbag assembly 100. Inflator 150 may comprise a tubular body, a gas-emitting end 154, first mounting stem 155, second mounting stem 156, and a connecting end 158. Inflator 150 is configured to generate inflation gas in response to an electric or electronic signal sent by vehicle sensors. First and second mounting stems 155 and 156 may each protrude away from a long axis of the inflator, as depicted in FIG. 5. Inflator 150 may comprise a pyrotechnic inflator that has a temperature output of between about 900K to about 1100K. In another embodiment, the inflator has a temperature output of about 1100K.

Figure 6A:
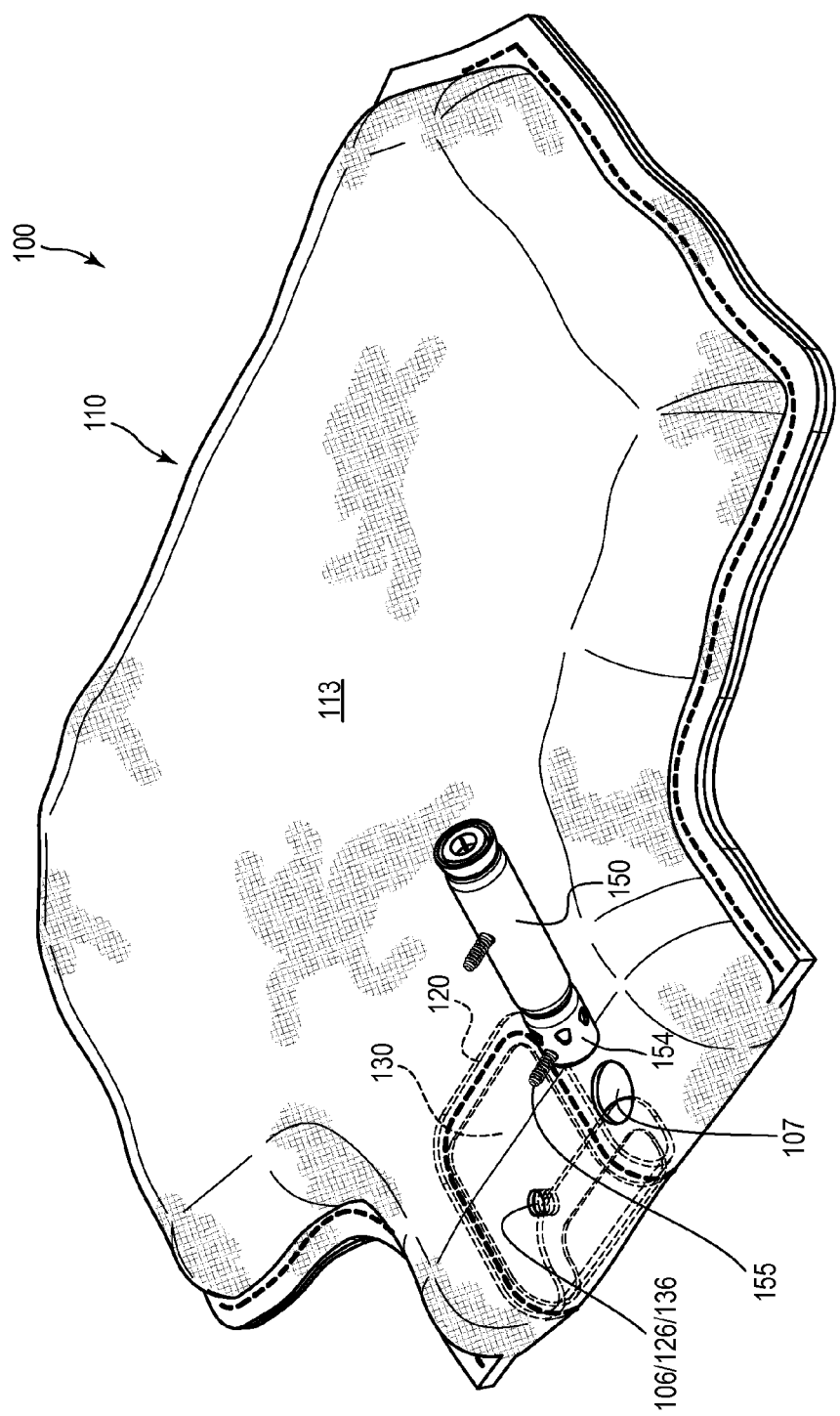
FIG. 6A is a perspective view of the airbag of FIG. 4 and the inflator of FIG. 5, wherein the inflator is in position to be inserted into the airbag.
Figure 6B:
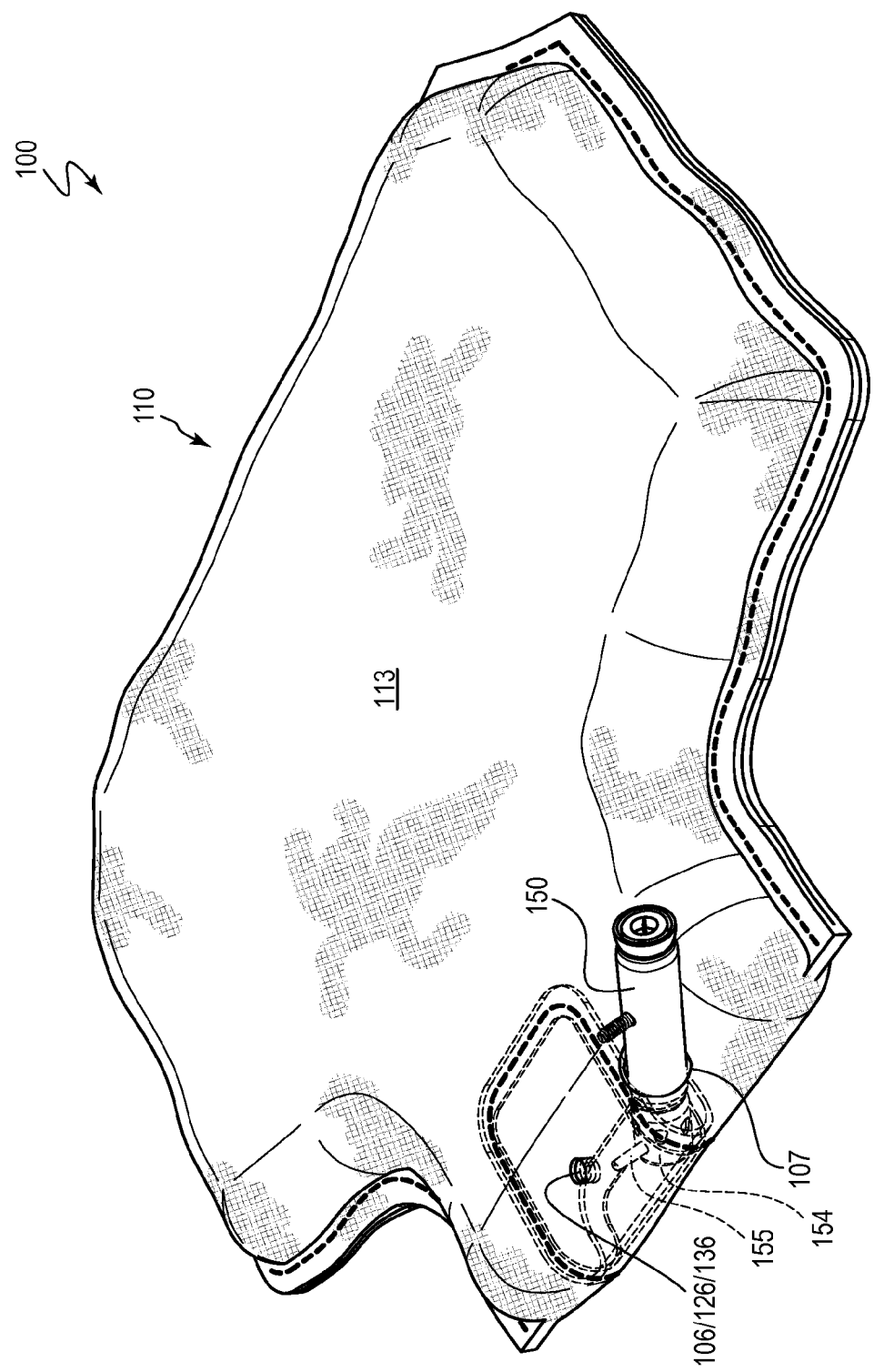
FIG. 6B is a perspective view of the airbag assembly of FIG. 6A after a portion of the inflator has been inserted into the airbag.
Figure 6C:
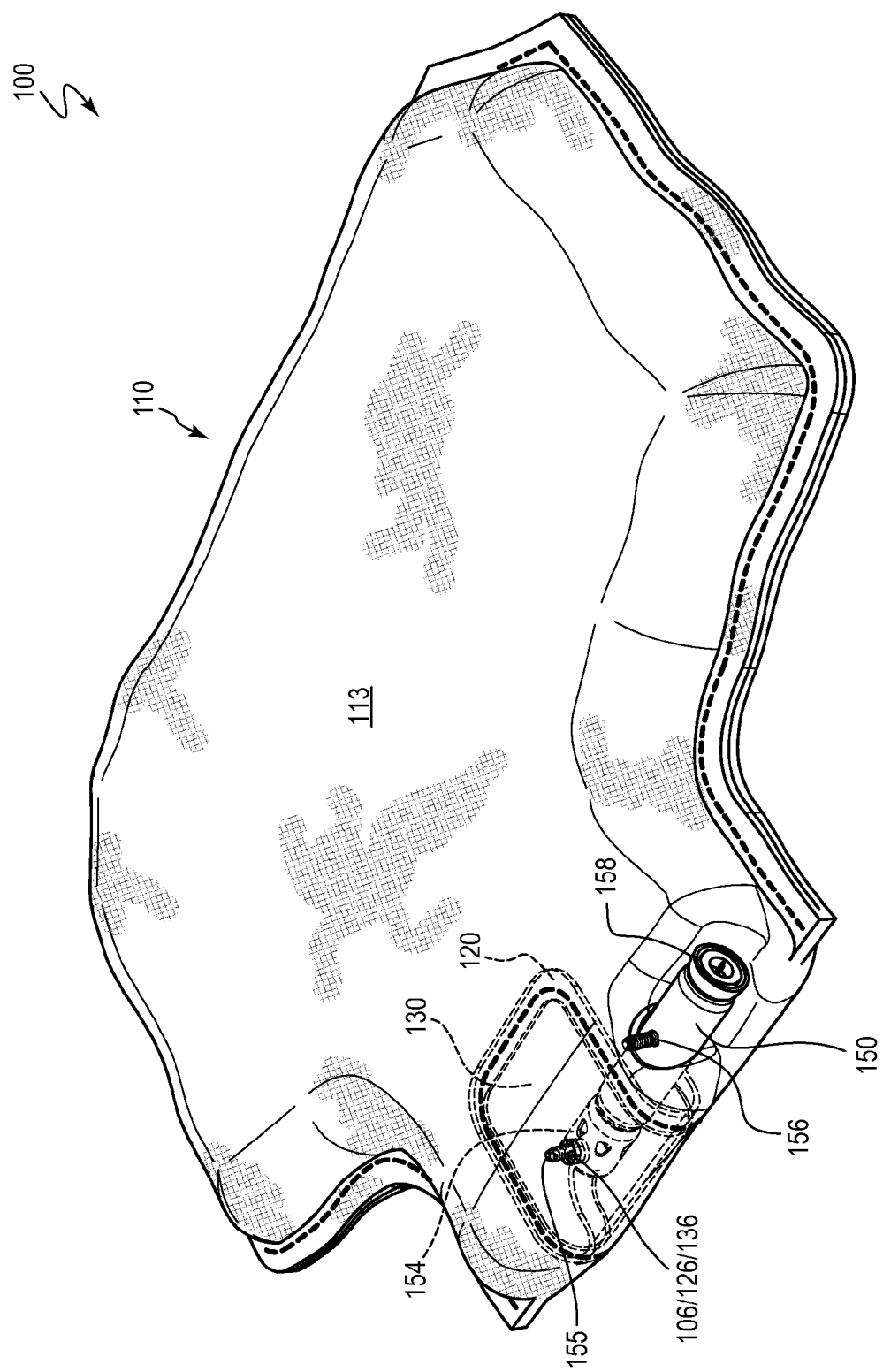
FIG. 6C is a perspective view of the airbag assembly of FIG. 6B after the inflator has been placed in position within the airbag.

FIGS. 6A-6C depict perspective views of car-forward face 113 of airbag 110, which comprises airbag assembly 100. Cover 120 and heat shield 130 have already been coupled to airbag 110 such that inflator mounting stem apertures 106, 126, and 136 are aligned. FIGS. 6A-6C depict a method for coupling inflator 150 to airbag 110, wherein first mounting stem 155 of gas emitting end 154 of inflator 150 is inserted into inflator insert aperture 107 of airbag 110. As depicted in FIG. 6B, after gas emitting end 154 of inflator 150 is inserted into the inflator insert aperture 107, the gas emitting end of the inflator is located in an inflatable void of airbag 110. First mounting stem 155 may then be aligned with inflator stem apertures 106, 126, and 136. As depicted in FIG. 6C, when inflator 150 has been correctly positioned, gas emitting end 154 is located within the inflatable void of airbag 110, first mounting stem 155 protrudes through apertures for inflator mounting stem 106, 126, and 136. Second mounting stem 156 and connecting end 158 may be said to be "outside" airbag 110, or may be said to be protruding through the inflator insert aperture.

As will be appreciated by those skilled in the art, a variety of types and configurations of inflatable airbags can be utilized without departing from the scope and spirit of the present disclosure. For example, the size, shape, and proportions of the airbag cushion may vary according to its use in different vehicles or different locations within a vehicle such that the airbag may comprise an inflatable curtain cushion; a rear passenger side airbag; a driver's airbag; a knee airbag; and/or a front passenger airbag. Also, the airbag may comprise one or more of any material well known in the art, such as a woven nylon fabric, which may be coated with a substance, such as silicone. Additionally, the airbag cushion may be manufactured using a variety of techniques such as one piece weaving, cut and sew, or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques. Also, the inflatable airbag may comprise one or more vents, which may be configured as discreet vents or dynamic vents. Generally, discreet vents do not change diameter during airbag deployment, and may not vary their capacity to vent inflation gas out the inflatable void of the airbag may not change during deployment. Dynamic vents may change diameter during airbag deployment and may vary their capacity to vent inflation gas out the inflatable void of the airbag may not change during deployment.

Figure 7:
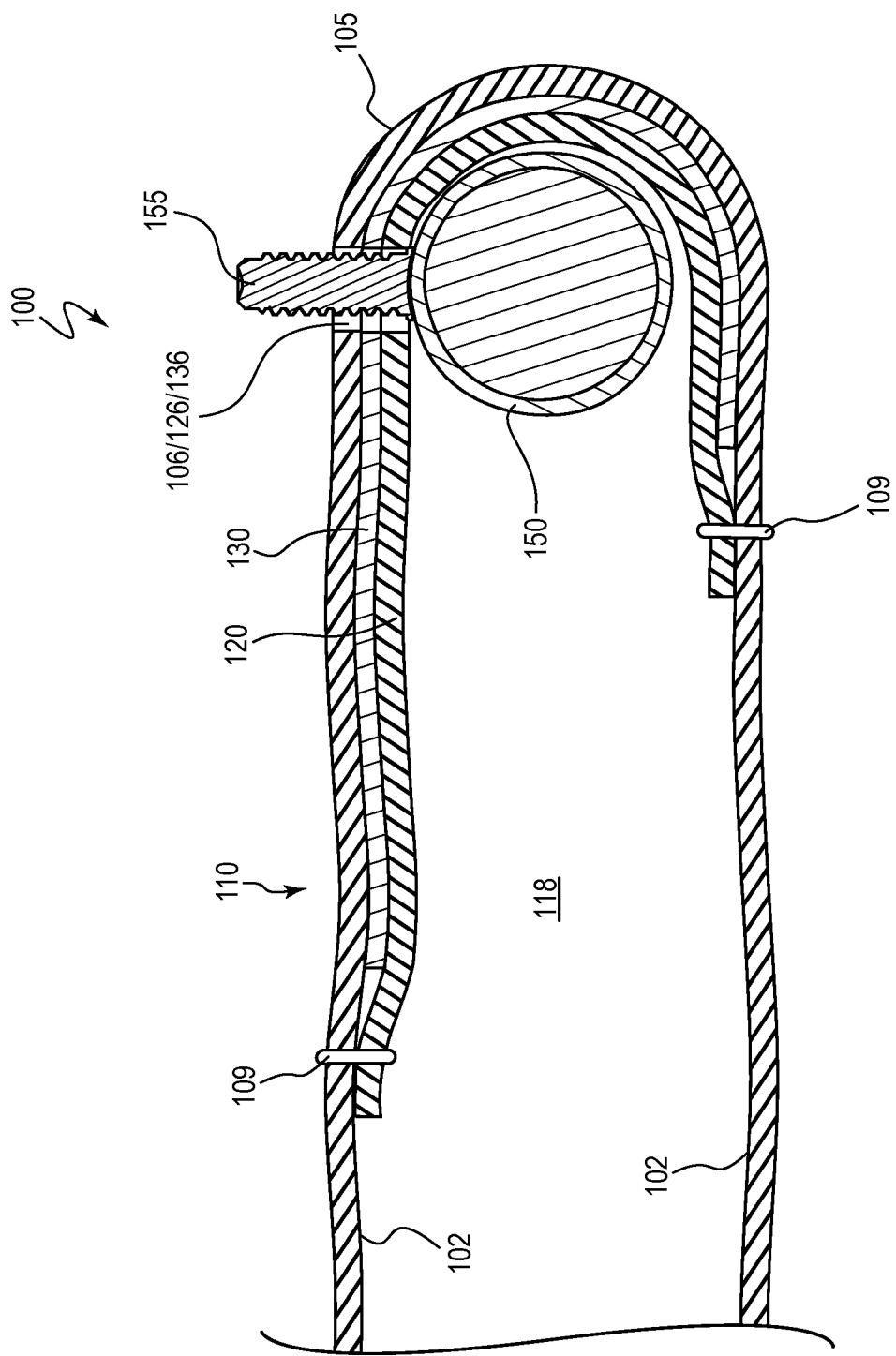
FIG. 7 is a cross-sectional view of a portion of the airbag assembly of FIG. 6C.

FIG. 7 is a cross-sectional view of inflatable airbag assembly 100, wherein heat shield 130 has been coupled to airbag 110 and inflator 150 has been inserted into inflatable void 118. Heat shield 130 may be coupled to inside face 102 of airbag 110 via stitching 109. Inflator 150 may be located adjacent a fold 105 of airbag 110. First inflator mounting stem 155 projects through apertures 106, 126, and 136 of airbag 110, cover 120 and heat shield 130.

Figure 8:
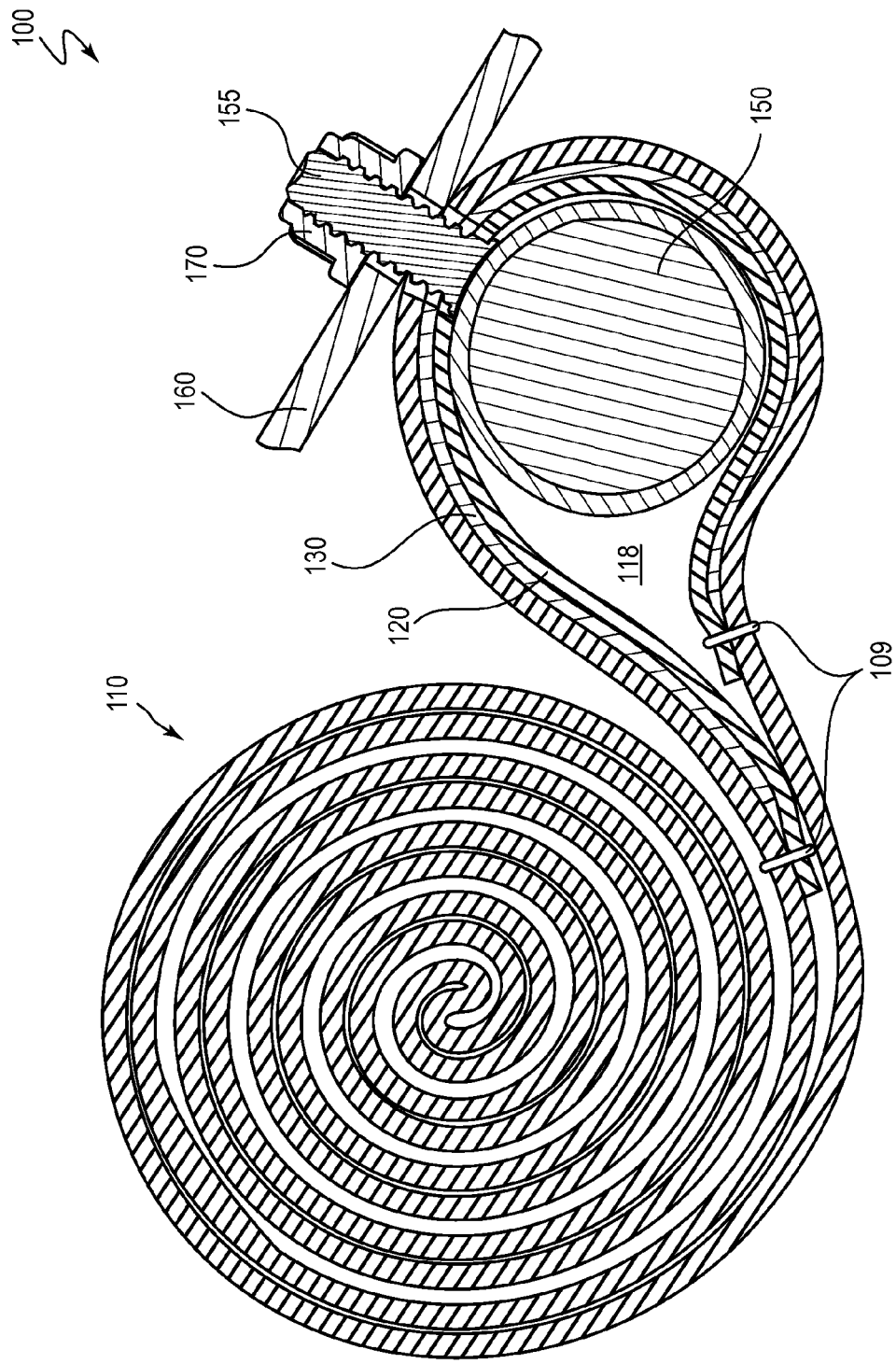
FIG. 8 is a cross-sectional view of the airbag assembly of FIG. 7 after the airbag has been placed in a packaged configuration and coupled to an inflatable airbag housing.

FIG. 8 is a cross sectional view of airbag assembly 100 of FIG. 7 after airbag 110 has been placed in a rolled and/or folded configuration. In the depicted embodiment, heat shield 130 is sandwiched between airbag 110 and cover 120. Cover 120 is coupled to airbag 110 via stitching 109. In the depicted embodiment, heat shield 130 is not directly coupled to airbag 110; however in other embodiments, the heat shield may be coupled directly to the airbag via stitching, gluing, or any other suitable technique. Inflator 150 is partially located within inflatable void 118 and is oriented such that first inflator mounting stem 155 projects through cover 120, heat shield 130, and airbag 110. Mounting stem 155 may also project through an airbag housing 160, and may receive mounting hardware 155.

Figure 9:
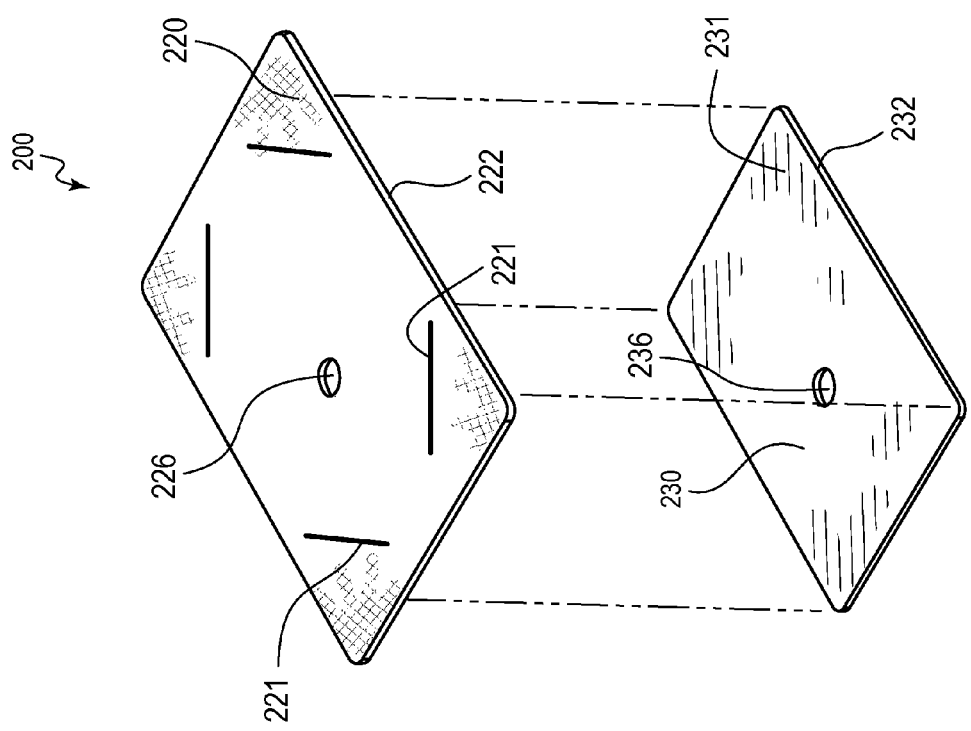
FIG. 9 is an exploded perspective view of another embodiment of a heat shield sub assembly.
Figure 10:
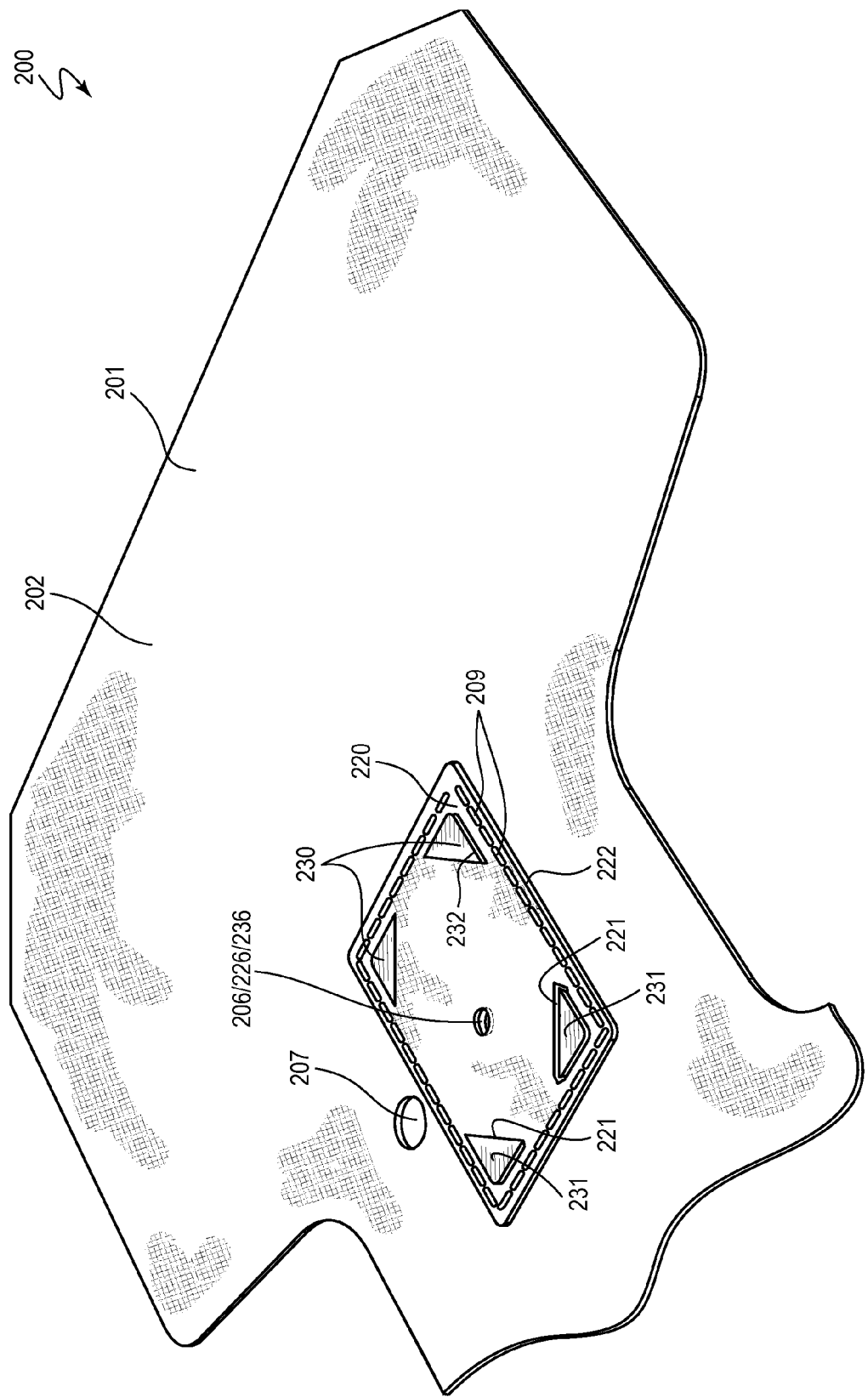
FIG. 10 is a cutaway perspective view of a portion of an airbag assembly with the heat shield sub-assembly of FIG. 9.

FIGS. 9-10 depict another embodiment of an airbag assembly 200 with a cover 220 and a heat shield 230, wherein airbag assembly 200, cover 220 and heat shield 230 resemble airbag assembly 100, cover 120 and heat shield 130, described above, in certain respects. Accordingly, like features may be designated with like reference numerals, with the leading hundreds numeral incremented from "1" to "2". Any suitable combination of the features described with respect to airbag assembly 100, cover 120 and heat shield 130 can be employed with assembly 200, cover 220 and heat shield 230, and vice versa.

In the embodiment of FIGS. 9-10, cover 220 comprises cutouts 221, into which corners 231 of heat shield 230 can be inserted such that the heat shield is retained on the cover. As such, it may be said that cover 220 and heat shield 230 form a sub-assembly of airbag assembly 200. In some embodiments, cover 220 and heat shield may comprise apertures 226 and 236 through which an inflator mounting stem may be inserted, as described herein for airbag assembly 100.

The sub-assembly comprising cover 220 and heat shield 230 may then be coupled to an inside face 202 of a panel of material 201 from which an inflatable airbag can be formed. The sub-assembly comprising cover 220 and heat shield 230 may be coupled to panel 201 via stitching 209, wherein the stitching is located between an edge 232 of the heat shield and an edge 222 of the cover. Cover 220 and heat shield 230 may be placed on panel 201 such that inflator insert aperture 207 is not obstructed and inflator mounting stem aperture 206 is at least partially aligned with apertures 226 and 236.

In some embodiments, prior to inflatable airbag assembly, the cover and heat shield are coupled together and comprise a sub-assembly. In other embodiments, the heat shield and cover may not be coupled together prior to inflatable airbag assembly. In yet other embodiments, the cover and heat shield may be coupled together to form a sub-assembly and are then coupled to the inflatable airbag after at least a portion of the inflatable airbag has been formed.

Figure 11A:
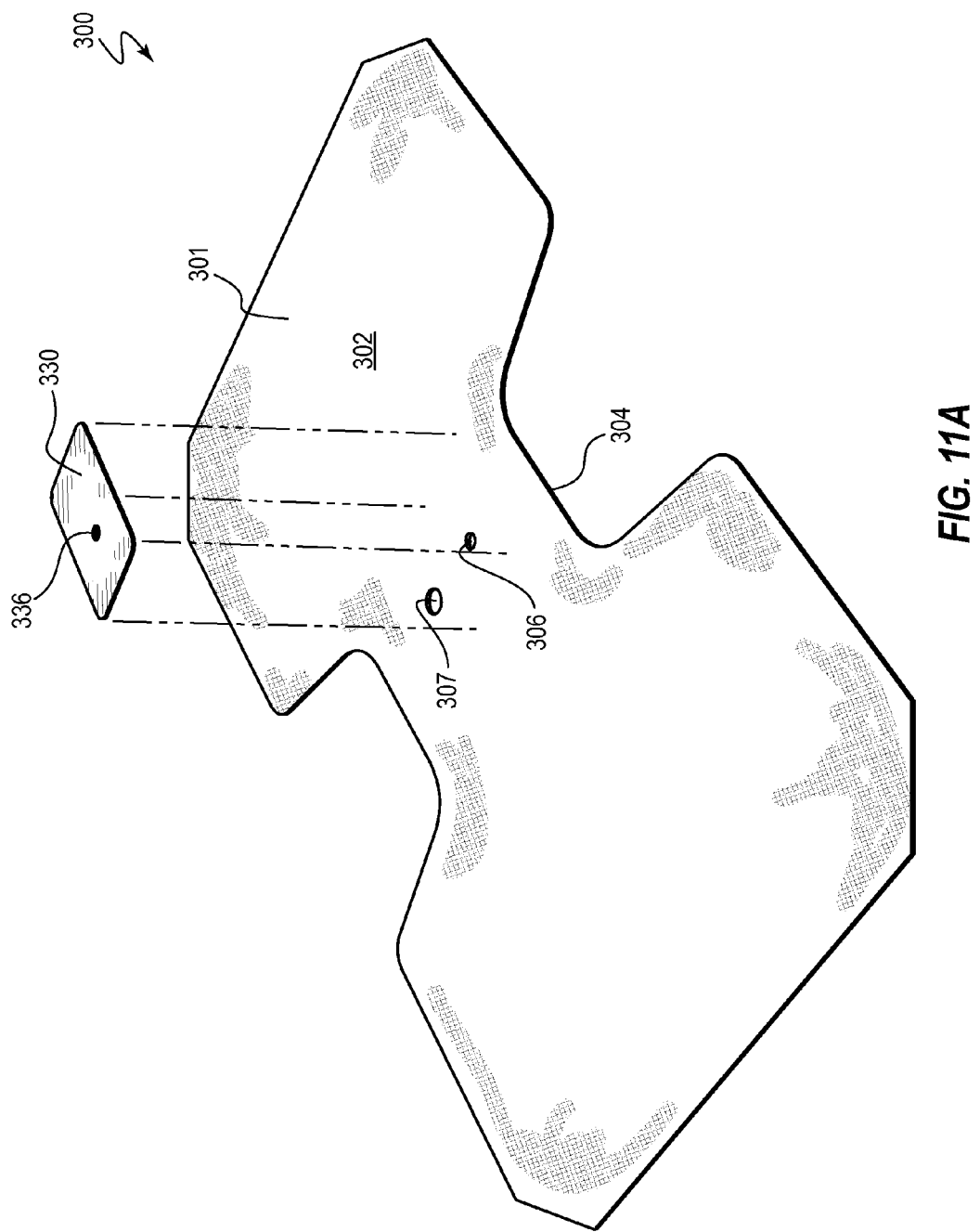
FIG. 11A is an exploded perspective view of another embodiment of an airbag assembly with a heat shield.
Figure 11B:
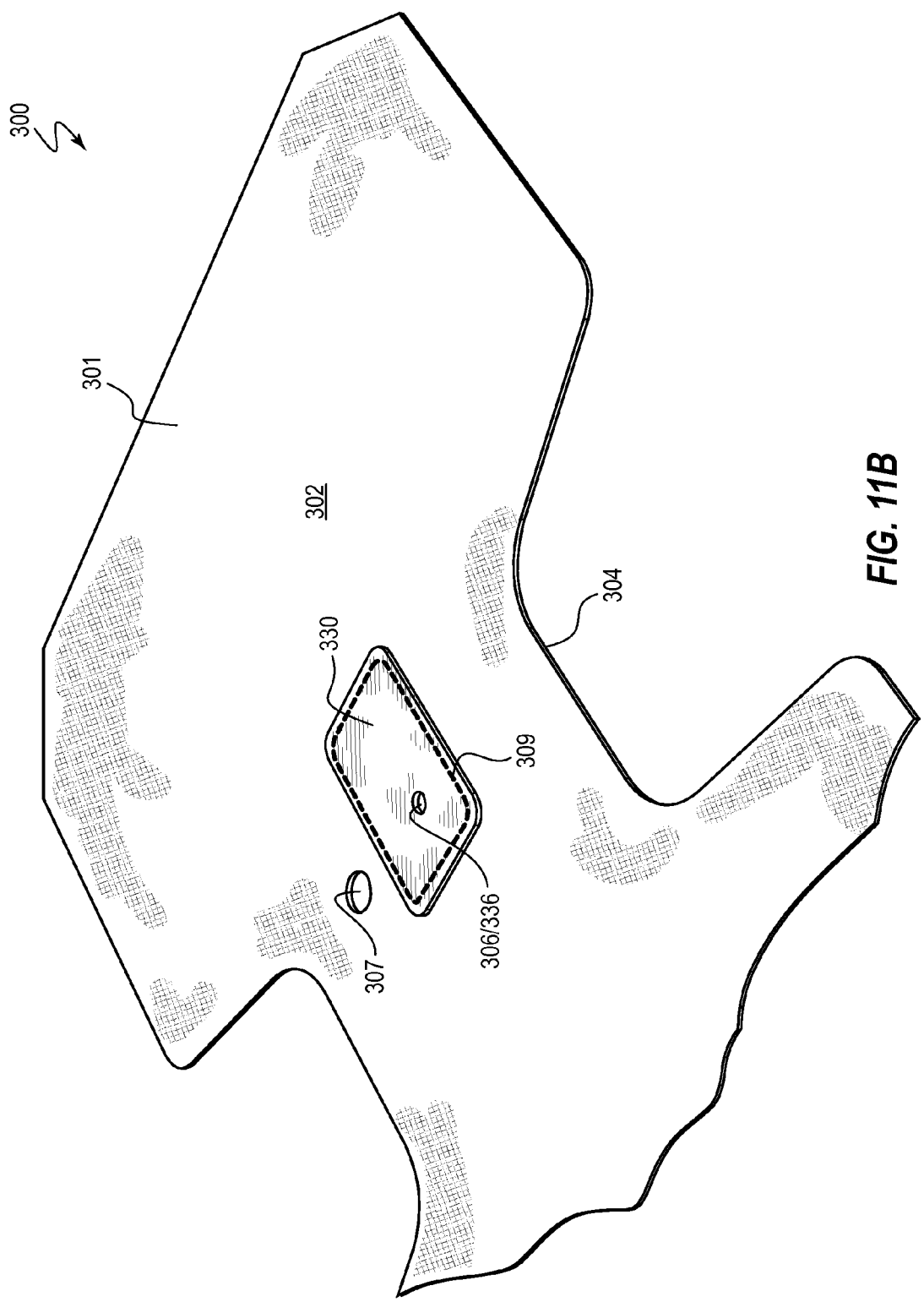
FIG. 11B is a perspective view of the airbag assembly of FIG. 10A after a heat shield has been coupled to a panel of material.

FIGS. 11A-11B are perspective views of a portion of airbag assembly 300 with a heat shield 330, wherein airbag assembly 300 and heat shield 330 resemble airbag assemblies 100 and 200, with heat shields 130 and 230 described above, in certain respects. Accordingly, like features may be designated with like reference numerals, with the leading hundreds numeral incremented from "1" or "2" to "3". Any suitable combination of the features described with respect to airbag assemblies 100 or 200 and heat shields 130 or 230 can be employed with assembly 300 and heat shield 330, and vice versa.

In the embodiment depicted in FIGS. 11A-11B, assembly 300 partially comprises a panel of material 301 and a heat shield 330. Heat shield 330 may be coupled to an inside face 302 of panel of material 301 via stitching 309, wherein stitching 309 protrudes through the heat shield and the panel of material. Heat shield 330 may be coupled to panel of material 301 at, adjacent to, or near a reduced width portion 304. Heat shield 330 may be coupled to panel of material 301 such that an inflator stem aperture 336 and inflator stem aperture 306 are at least partially aligned, and inflator insert aperture 307 is not obstructed.

FIGS. 12A-14 depict an airbag assembly 400 with a heat shield 430, wherein airbag assembly 400 and heat shield 430 resemble airbag assemblies 100-300, with heat shields 130-330 described above, in certain respects. Accordingly, like features may be designated with like reference numerals, with the leading hundreds numeral incremented from "1"-"3" to "4". Any suitable combination of the features described with respect to airbag assemblies 100-300 and heat shields 130-330 can be employed with assembly 400 and heat shield 430, and vice versa.

Figure 12A:
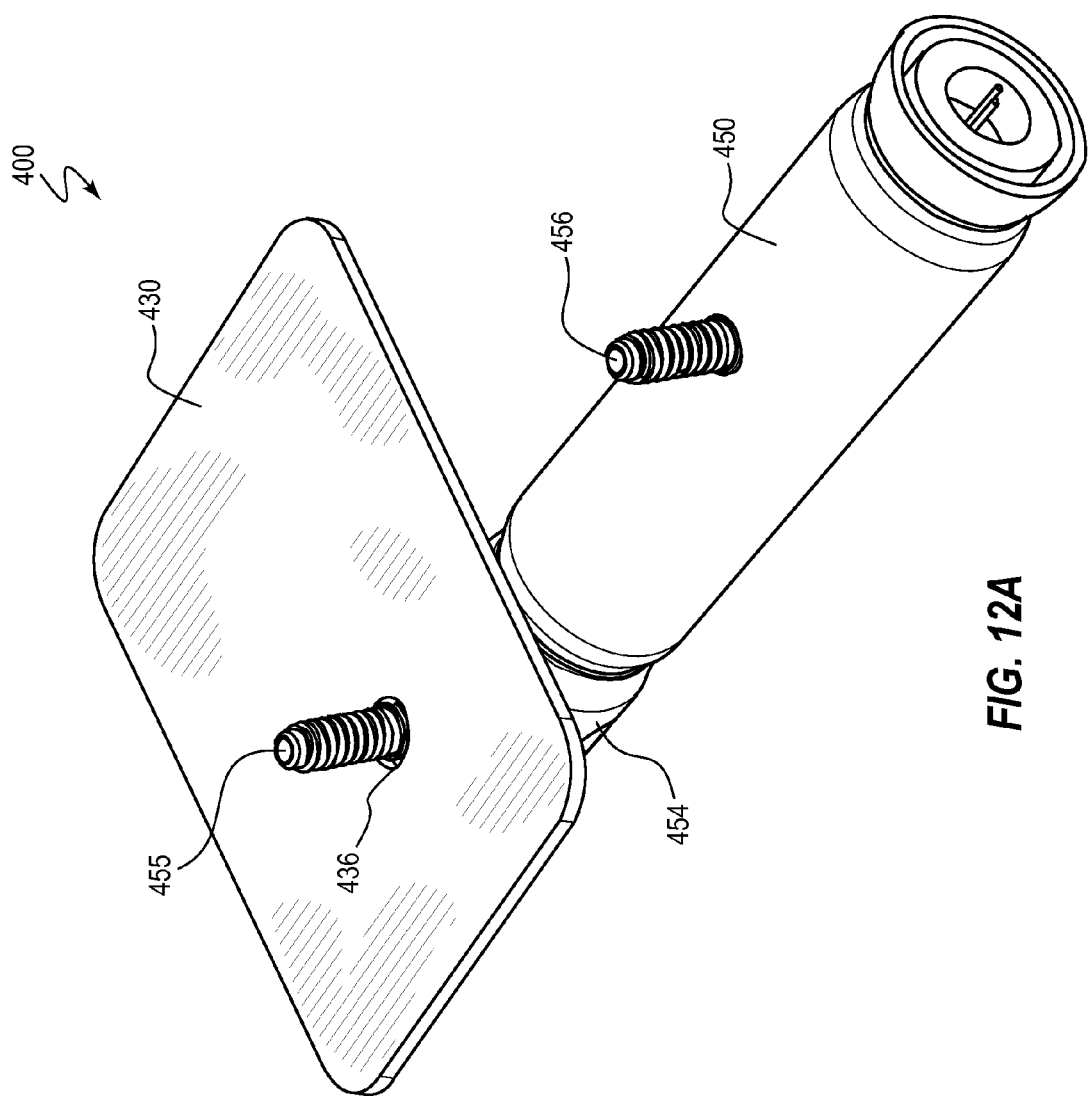
FIG. 12A is a perspective view of a portion of another embodiment of an airbag assembly.
Figure 12B:
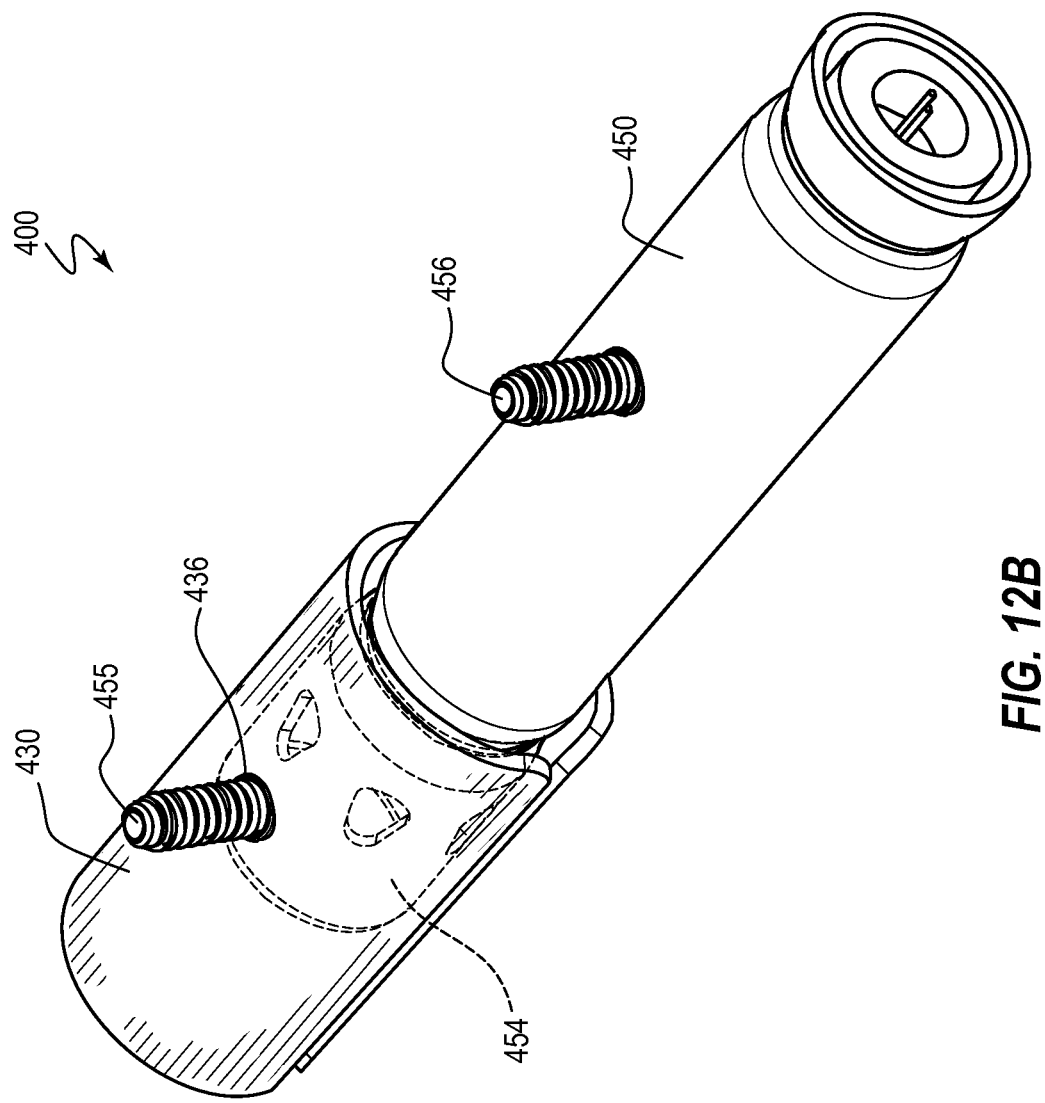
FIG. 12B is a perspective view of the portion of the airbag assembly of FIG. 11A after a heat shield has been wrapped around an inflator.

FIGS. 12A-12B are perspective views of a portion of airbag assembly 400, wherein the airbag assembly comprises a heat shield 430 and an inflator 450. In the depicted embodiment, heat shield 430 may be coupled to inflator 450, rather than a panel of material that forms an inflatable airbag, as described herein. Inflator 450 may comprise a tubular shape having a gas-emitting end 454, a first inflator mounting stem 455, and a second inflator mounting stem 456. Heat shield 430 may be coupled to inflator 450 via inflator insert aperture 436 receiving first inflator mounting stem 455. Heat shield 430 may also be folded and/or wrapped around inflator 450. In some embodiments, the heat shield may lack an inflator insert aperture, in which case, the heat shield may not be coupled to the inflator via an inflator mounting stem, but rather may be wrapped around the gas-emitting end of the inflator. The heat shield may partially encompass the gas-emitting end of the inflator, or may be said to circumnavigate the gas-emitting end of the inflator.

Figure 13A:
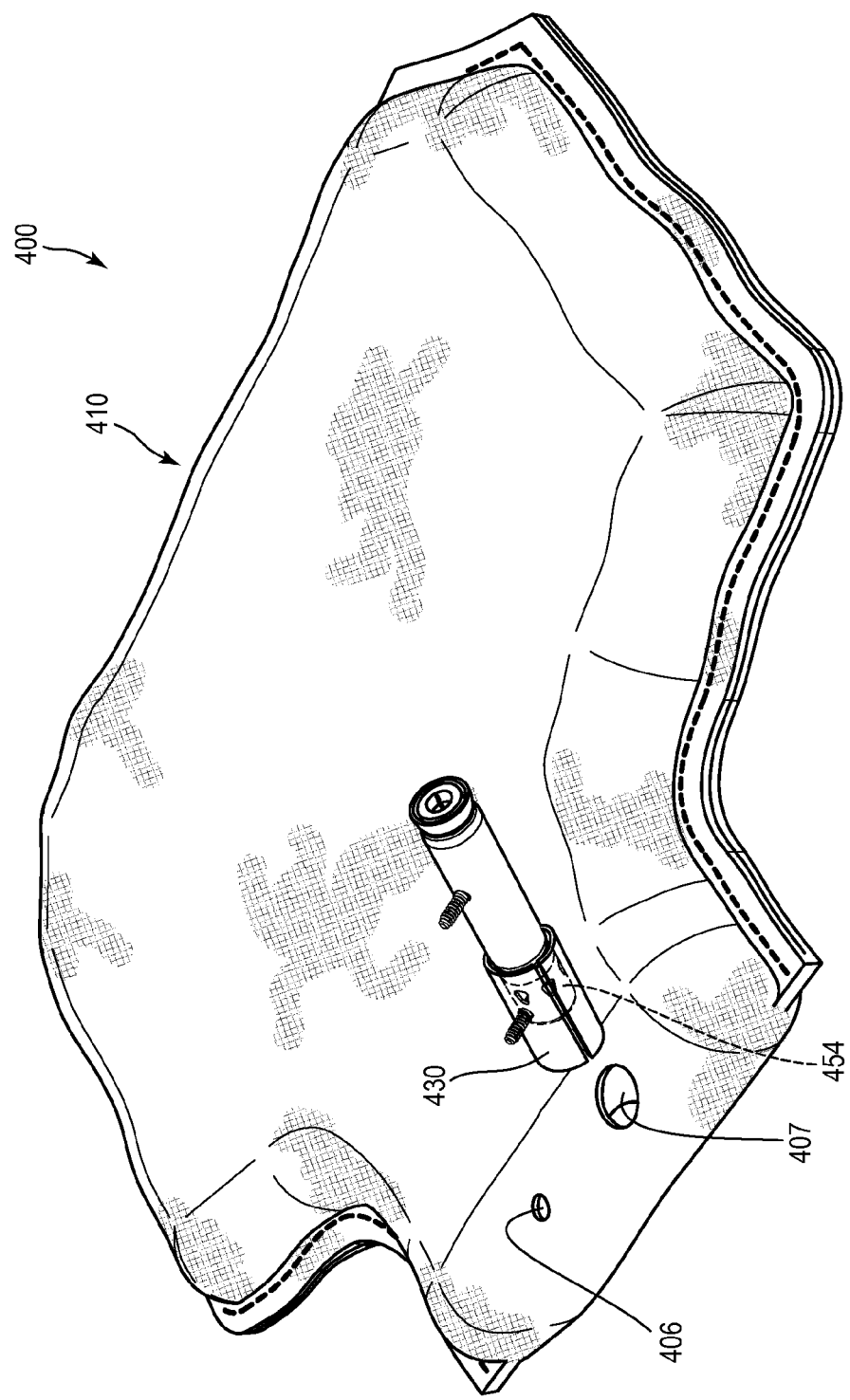
FIG. 13A is a perspective view of the inflator and heat shield of FIG. 11B, wherein the inflator and heat shield are in position to be inserted into an airbag.
Figure 13B:
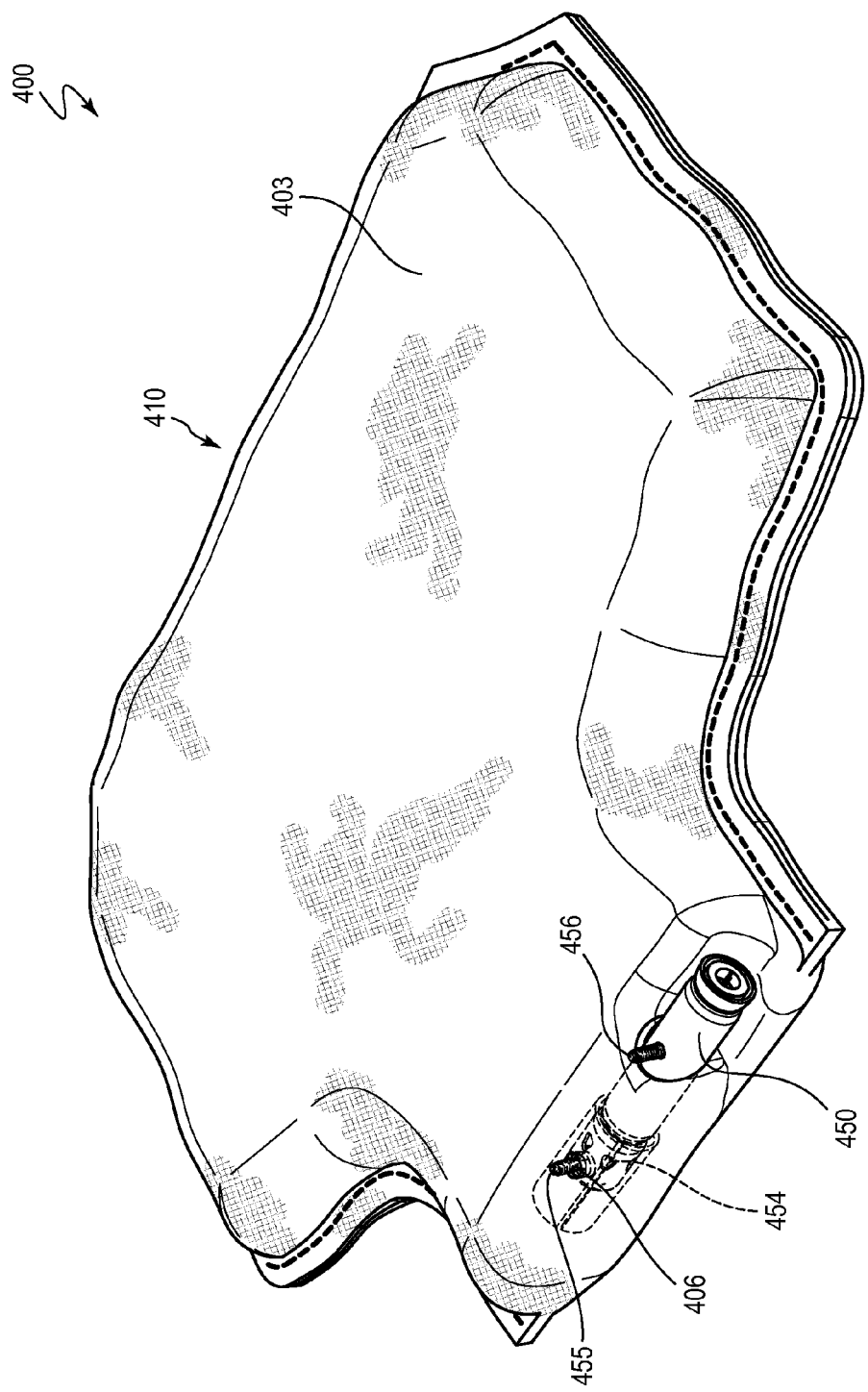
FIG. 13B is a perspective view of the airbag assembly of FIG. 12A after the inflator and heat shield have been placed in position within the airbag.

FIGS. 13A-13B depict airbag assembly 400 from a perspective view, wherein FIG. 13A depicts heat shield 430 and inflator 450 before they have been inserted into airbag 410, and FIG. 13B depicts the heat shield and inflator after they have been inserted into the airbag. As described herein, airbag 410 may comprise an inflator insert aperture 407 and an inflator mounting stem aperture 406. After heat shield 430 has been coupled to gas-emitting end 454 of inflator 450, the gas-emitting end and the heat shield may be inserted into inflator insert aperture 407 of airbag 410. Gas-emitting end 454 may continue to be directed toward inflator mounting stem aperture 406 until first inflator mounting stem 455 can protrude through aperture 406. Second inflator mounting stem 456 may not be inserted into aperture 407.

Figure 14:
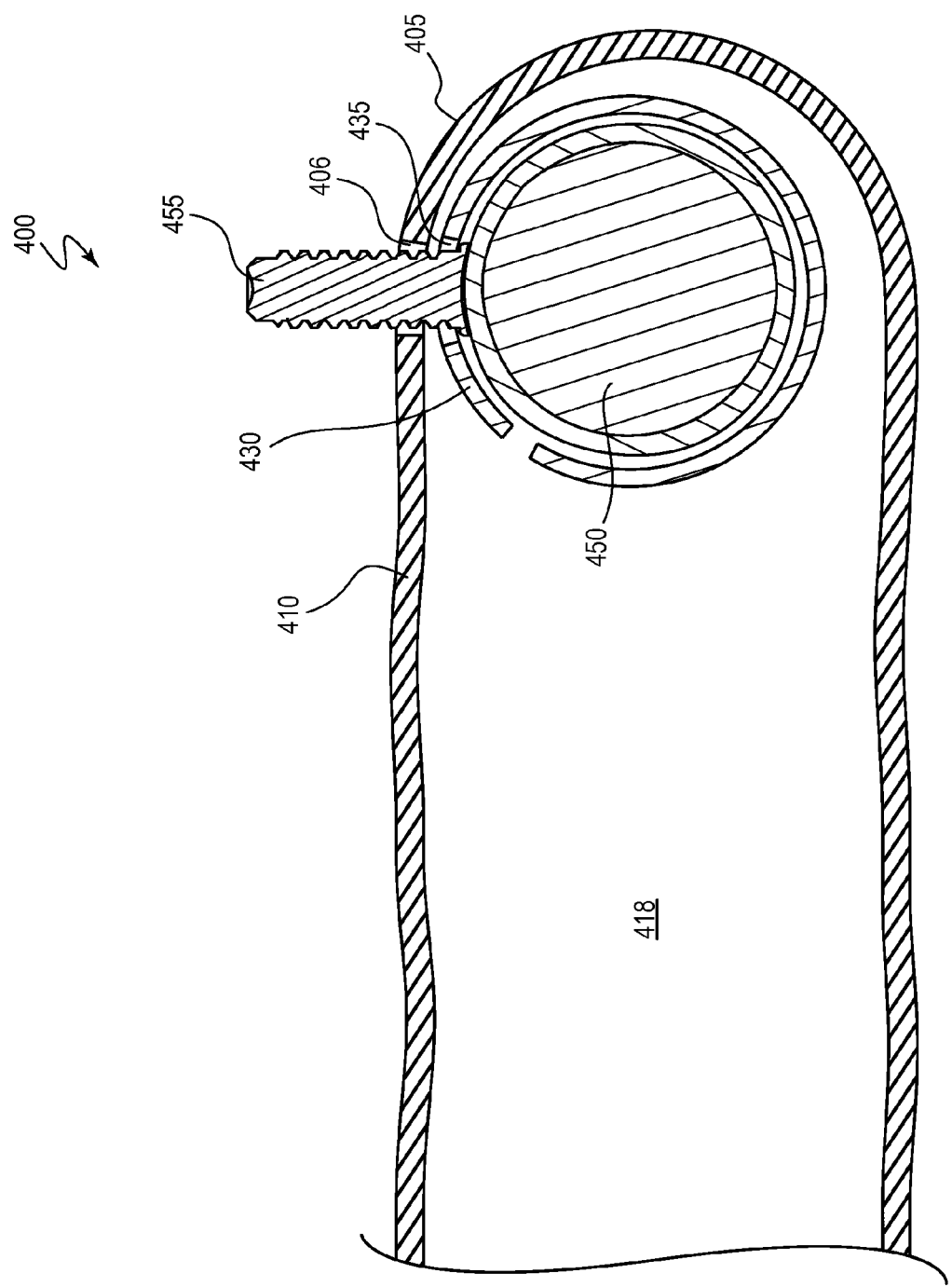
FIG. 14 is a cross-sectional view of the air bag assembly of FIG. 12B.

FIG. 14 is a cutaway cross-sectional view of airbag assembly 400, wherein a portion of inflator 450 is within an inflatable void 418 of airbag 410. Heat shield 430 has been coupled to inflator 450. Inflator mounting stem 455 of inflator 450 is protruding through inflator mounting stem aperture 436 of heat shield 430 and inflator mounting stem aperture 406 of airbag 410.

Figure 15A:
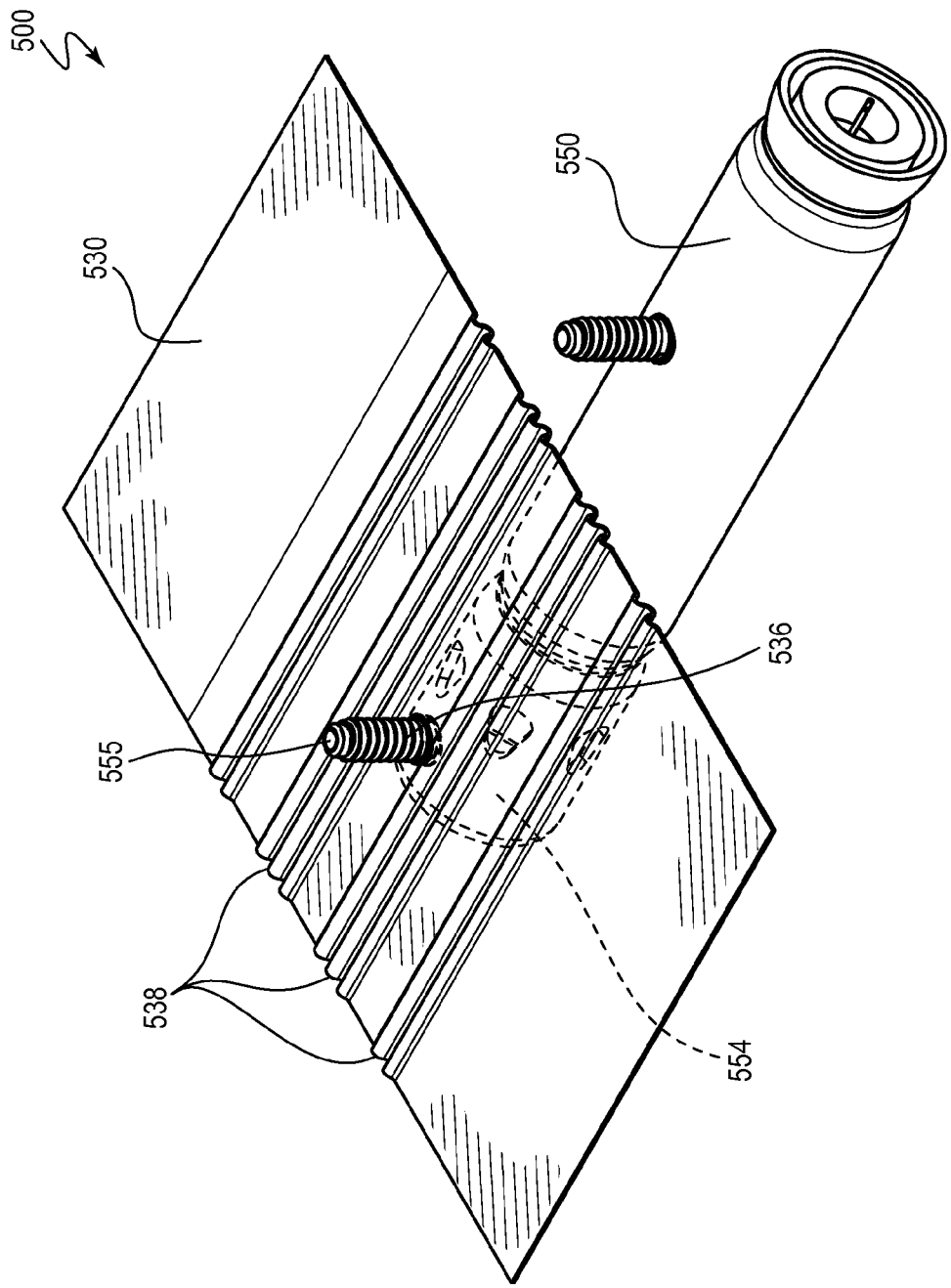
FIG. 15A is a perspective view of another embodiment of a portion of an airbag assembly.
Figure 15B:
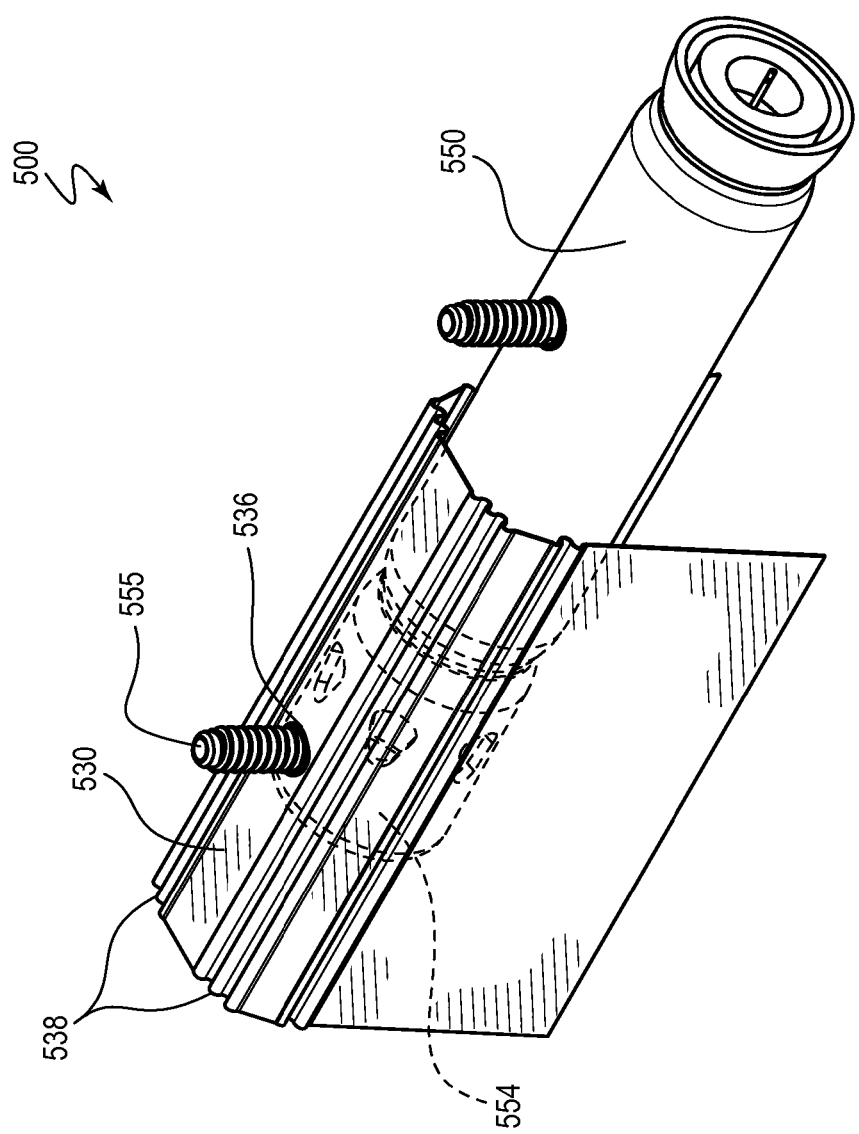
FIG. 15B is a perspective view of the portion of the airbag assembly of FIG. 14A after a heat shield has been partially wrapped around an inflator.
Figure 16:
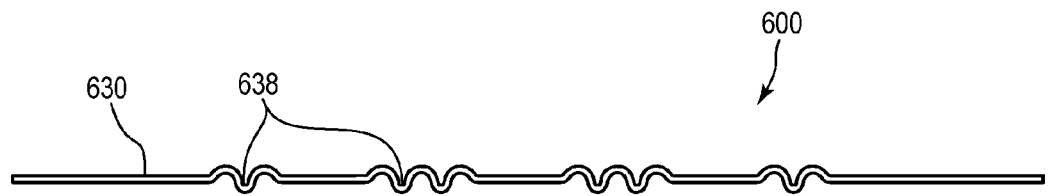
FIG. 16 is a side elevation view of another embodiment of a heat shield for an inflatable airbag cushion.
Figure 17:
FIG. 17 is a side elevation view of another embodiment of a heat shield for an inflatable airbag cushion.
Figure 18:
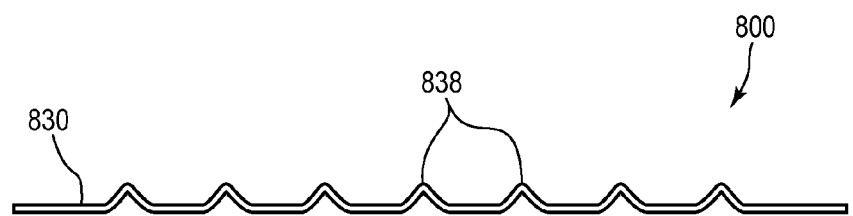
FIG. 18 is a side elevation view of another embodiment of a heat shield for an inflatable airbag cushion.
Figure 19:
FIG. 19 is a side elevation view of another embodiment of a heat shield for an inflatable airbag cushion.
Figure 20:
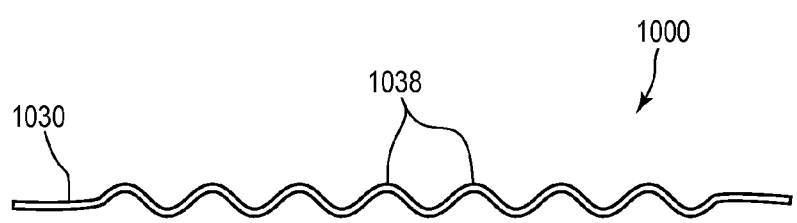
FIG. 20 is a side elevation view of another embodiment of a heat shield for an inflatable airbag cushion.

FIGS. 15A-15B depict perspective views of an airbag assembly 500 with a heat shield 530, wherein airbag assembly 500 and heat shield 530 resemble airbag assemblies 100-400, with heat shields 130-430 described above, in certain respects. Accordingly, like features may be designated with like reference numerals, with the leading hundreds numeral incremented from "1"-"4" to "5". Any suitable combination of the features described with respect to airbag assemblies 100-400 and heat shields 130-430 can be employed with assembly 500 and heat shield 530, and vice versa.

FIGS. 15A-15B are perspective views of a portion of airbag assembly 500, wherein the airbag assembly comprises a heat shield 530 and an inflator 550. In the depicted embodiment, heat shield 530 may be coupled to inflator 550, rather than a panel of material that forms an inflatable airbag, as described herein. Inflator 550 may comprise a tubular shape having a gas-emitting end 554 and a first inflator mounting stem 555. Heat shield 530 may be coupled to inflator 550 via inflator insert aperture 536 receiving first inflator mounting stem 555. Heat shield 530 may also be folded and/or wrapped around inflator 550. Heat shield 530 may also comprise ribs 538, which are configured to allow the heat shield to be wrapped and/or folded around inflator 550 more easily, or with more predictable results compared to heat shields without ribs. Ribs 538 may also be described as corrugations.

FIGS. 16-20 depict side elevation views of heat shields 630-1030 of airbag assemblies 600-1000, wherein the heat shields 630-1030 resemble heat shields 130-530 described above, in certain respects. Accordingly, like features may be designated with like reference numerals, with the leading hundreds numeral incremented from "1"-"5" to "6"-"10". Any suitable combination of the features described with respect to airbag assemblies 100-500 and heat shields 130-530 can be employed with assemblies 600-1000 and heat shields 630-1030, and vice versa. FIGS. 16-20 depict side elevation views of heat shields 630, 730, 830, 930, and 1030 of airbag assemblies 600, 700, 800, 900, and 1000, wherein the heat shields comprise ribs 638, 738, 838, 938, and 1038.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the disclosure is therefore defined by the following claims.

The invention claimed is:

1. An inflatable airbag assembly comprising:
an inflatable airbag;
an inflator coupled to the inflatable airbag, wherein the inflator comprises a tubular body with a gas-emitting end and an opposing connecting end,
wherein the inflator comprises a first mounting stem and a second mounting stem,
wherein the first mounting stem is located at the gas-emitting end that projects away from a long axis of the tubular body
wherein the second mounting stem is located at the connecting end that projects away from the long axis of the tubular body; and,
a metal heat shield coupled to the inflatable airbag such that an aperture in the inflatable airbag at least partially aligns with an aperture in the heat shield,
wherein the inflator mounting stem protrudes through the aperture in the heat shield and the aperture in the inflatable airbag,
wherein the heat shield is at least partially located between the gas-emitting end of the inflator and the inflatable airbag,
wherein the heat shield is restricted to the gas-emitting end of the inflator, such that the heat shield does not extend to the second mounting stem and does not extend along an entire length of the long axis of the inflator, and
wherein the heat shield has a length and thickness that permit the heat shield to be manipulated, without the use of a powered machine or powered tool, from a planar configuration to being at least partially wrapped around the gas-emitting end of the inflator such that the heat shield is coupled to the gas-emitting end of the inflator.

2. The inflatable airbag assembly of claim 1, wherein the heat shield comprises steel.

3. The inflatable airbag assembly of claim 1, wherein the heat shield comprises a "U" shape when at least partially wrapped around the gas-emitting end of the inflator.

4. The inflatable airbag assembly of claim 1, wherein the heat shield comprises a "C" shape when at least partially wrapped around the gas-emitting end of the inflator.

5. The inflatable airbag assembly of claim 1, wherein the heat shield is coupled to the inflator before the inflator is coupled to the inflatable airbag.

6. The inflatable airbag assembly of claim 1 wherein the heat shield comprises a plurality of ribs.

7. An inflatable airbag assembly comprising:
an inflatable airbag;
an inflator coupled to the inflatable airbag, wherein the inflator comprises a tubular body with a gas-emitting end and an opposing connecting end, and wherein the inflator also comprises a mounting stem located at the gas-emitting end that projects away from a long axis of the tubular body; and,
a metal heat shield coupled to the inflatable airbag such that an aperture in the inflatable airbag at least partially aligns with an aperture in the heat shield, wherein the heat shield is sewn to the inflatable airbag such that a stitching protrudes through the heat shield, wherein the inflator mounting stem protrudes through the aperture in the heat shield and the aperture in the inflatable airbag, wherein the heat shield is at least partially located between the gas-emitting end of the inflator and the inflatable airbag, and wherein the heat shield is restricted to the gas-emitting end of the inflator, such that the heat shield does not extend along an entire length of the long axis of the inflator.

8. The inflatable airbag assembly of claim 7, wherein the heat shield comprises a "U" shape.

9. The inflatable airbag assembly of claim 7, wherein the heat shield comprises a "C" shape.

10. The inflatable airbag assembly of claim 7, wherein the heat shield comprises a plurality of ribs.

11. The inflatable airbag assembly of claim 7, wherein a thickness of the metal heat shield is between 0.003 inches and 0.20 inches.

12. The inflatable airbag assembly of claim 11, wherein the airbag comprises an inflatable knee airbag.

13. The inflatable airbag assembly of claim 11, wherein the airbag comprises an inflatable side airbag.

14. The inflatable airbag assembly of claim 11, wherein the airbag comprises an inflatable driver's side airbag.

15. The inflatable airbag assembly of claim 11, wherein the airbag comprises an inflatable front airbag.

16. The inflatable airbag assembly of claim 11, wherein the airbag comprises an inflatable curtain airbag.

17. The inflatable airbag assembly of claim 11, wherein the heat shield comprises steel.

18. An inflatable airbag assembly comprising:
an inflatable airbag;
an inflator coupled to the inflatable airbag, wherein the inflator comprises a tubular body with a gas-emitting end and an opposing connecting end, and wherein the inflator also comprises a mounting stem located at the gas-emitting end that projects away from a long axis of the tubular body; and,
a metal heat shield comprising a plurality of ribs,
wherein the heat shield is coupled to the inflatable airbag such that an aperture in the inflatable airbag at least partially aligns with an aperture on the heat shield,
wherein the inflator mounting stem protrudes through the aperture in the heat shield and the aperture in the inflatable airbag,
wherein the heat shield is at least partially located between the gas-emitting end of the inflator and the inflatable airbag, and
wherein the heat shield is restricted to the gas-emitting end of the inflator, such that the heat shield does not extend along an entire length of the long axis of the inflator.

19. The inflatable airbag assembly of claim 18, wherein the heat shield comprises a "U" shape.

20. The inflatable airbag assembly of claim 18, wherein the heat shield comprises a "C" shape.

21. The inflatable airbag assembly of claim 18, wherein the gas-emitting end of the inflator and the heat shield are located within an inflatable void of the inflatable airbag, and the connecting end of the inflator is located outside the inflatable void.

22. An inflatable airbag assembly comprising:
an inflatable airbag having an aperture;
a metal heat shield coupled to the inflatable airbag via a fabric cover, wherein the cover is sewn around a perimeter of the cover and the heat shield is located within a perimeter of the cover, and
wherein the heat shield and the cover each have an aperture, and wherein the apertures of the inflatable airbag, the heat shield, and the cover each are at least partially aligned; and,
an inflator coupled to the inflatable airbag, wherein the inflator comprises a tubular body with a gas-emitting end and an opposing connecting end,
wherein the inflator also comprises a mounting stem located at the gas-emitting end that projects away from a long axis of the tubular body,
wherein the inflator mounting stem protrudes through the apertures in the cover, the heat shield and the inflatable airbag,
wherein the heat shield is at least partially located between the gas-emitting end of the inflator and the inflatable airbag, and
wherein the heat shield is restricted to the gas-emitting end of the inflator, such that the heat shield does not extend along an entire length of the long axis of the inflator.

23. The inflatable airbag assembly of claim 22, wherein the cover is sewn to the inflatable airbag such that a stitching protrudes through the heat shield.

24. The inflatable airbag assembly of claim 22, wherein the heat shield comprises a plurality of ribs.

25. The inflatable airbag assembly of claim 22, wherein the gas-emitting end of the inflator and the heat shield are located within an inflatable void of the inflatable airbag, and the connecting end of the inflator is located outside the inflatable void.

26. The inflatable airbag assembly of claim 22, wherein the heat shield comprises a "U" shape when coupled to the gas-emitting end of the inflator.

27. The inflatable airbag assembly of claim 22, wherein the heat shield comprises a "C" shape when coupled to the gas-emitting end of the inflator.

28. The inflatable airbag assembly of claim 22, wherein prior to inflatable airbag assembly, the cover and the heat shield are coupled together and comprise a sub assembly.

29. The inflatable airbag assembly of claim 28, wherein the cover comprises a plurality of cut-outs such that an equal number of corners of the heat shield can be placed into the cutouts, thereby retaining the heat shield on the cover.

30. The inflatable airbag assembly of claim 28, wherein the cover and the heat shield are coupled together via stitching, which protrudes through the cover and the heat shield.

* * * * *